US012697613B2

(12) United States Patent
Asthana et al.

(10) Patent No.: US 12,697,613 B2
(45) Date of Patent: Aug. 4, 2026

(54) H-TYPE FILTER DEVICE FOR ANALYSING A COMPONENT

(71) Applicant: Fluidic Analytics Limited, Cambridge (GB)

(72) Inventors: Ashish Asthana, Cambridge (GB); Jean-Paul Delport, Cambridge (GB); Sean Devenish, Cambridge (GB); Anthony Douglas, Cambridge (GB); Hannah Kenyon, Cambridge (GB); Maren Butz, Cambridge (GB); Viola Denninger, Cambridge (GB); Simon Morling, Cambridge (GB); Thomas Mueller, Cambridge (GB); Laurence Young, Cambridge (GB); Simon Chandler, Cambridge (GB)

(73) Assignee: Fluidic Analytics Limited, Cambridge (GB)

( * ) Notice: Subject to any disclaimer, the term of this patent is extended or adjusted under 35 U.S.C. 154(b) by 713 days.

(21) Appl. No.: 18/022,134

(22) PCT Filed: Aug. 20, 2021

(86) PCT No.: PCT/GB2021/052172
§ 371 (c)(1),
(2) Date: Feb. 17, 2023

(87) PCT Pub. No.: WO2022/038376
PCT Pub. Date: Feb. 24, 2022

(65) Prior Publication Data

US 2024/0009666 A1 Jan. 11, 2024

(30) Foreign Application Priority Data

Aug. 21, 2020 (GB) ..................................... 2013124
Aug. 21, 2020 (GB) ..................................... 2013125

(51) Int. Cl.
*B01L 3/00* (2006.01)

(52) U.S. Cl.
CPC ... *B01L 3/502715* (2013.01); *B01L 3/502707* (2013.01); *B01L 2300/0883* (2013.01)

(58) Field of Classification Search
CPC ......... B01L 3/502715; B01L 3/502707; B01L 2300/0883; B01L 3/502776;
(Continued)

(56) References Cited

U.S. PATENT DOCUMENTS 7,999,937 B1 * 8/2011 Srivastava ........ B01L 3/502761
356/338
9,952,222 B2 4/2018 Yates et al.
(Continued)

FOREIGN PATENT DOCUMENTS

EP 3 391 967 A1 10/2018
WO WO-03089158 A1 * 10/2003 ............. G01N 15/14
(Continued)

OTHER PUBLICATIONS

Search Report under Section 17 for GB Application No. 2013124.9 dated Feb. 22, 2021.
(Continued)

*Primary Examiner* — Melvin C. Mayes
*Assistant Examiner* — Sophia Y Lyle

(57) ABSTRACT

A flow apparatus for measuring at least one biophysical property of one or more components is provided. The apparatus comprises one or more microfluidic devices. Each microfluidic device comprises: a sample channel having a sample inlet port for introducing a sample fluid flow comprising one or more components at a first flow rate into an elongate distribution channel, an auxiliary channel having an auxiliary inlet port for introducing an auxiliary fluid flow at a second flow rate into the elongate distribution channel.
(Continued)

The distribution channel is configured to enable a lateral distribution of the components from the sample fluid flow into the auxiliary fluid flow. Each microfluidic device further comprises two or more capillary channels provided downstream and in fluid communication with the distribution channel, at least one outlet port provided downstream of each of the capillary channels. The sample inlet port and/or the outlet port further comprises an expansion feature between the channel and the corresponding port, whereby the expansion feature comprises a tapered section adjacent to the channel and a curved section adjacent to the port. The apparatus further comprises a switchable pressure source configured to control the flow of the fluids through the channels; and a detector configured to detect and measure at least one biophysical property of the or each component sequentially or simultaneously in each of the capillary channels and/or outlet ports on the microfluidic device.

19 Claims, 12 Drawing Sheets

(58) Field of Classification Search
CPC ......... B01L 2200/027; B01L 3/502753; B01L 3/502746; B01L 2200/0694; B01L 2300/0816; B01L 2300/0864; B01L 2300/0867; B01L 2400/088; B01L 2400/0406; B01L 2400/0487; B01L 2200/0647; G01N 15/149
See application file for complete search history.

(56) References Cited

U.S. PATENT DOCUMENTS

| | | | |
|---|---|---|---|
| 9,958,369 | B2 | 5/2018 | Cohen et al. |
| 10,295,545 | B2 | 5/2019 | Yates et al. |
| 10,386,332 | B2 | 8/2019 | Herling et al. |
| 10,620,102 | B2 | 4/2020 | Mueller et al. |
| 10,670,504 | B2 | 6/2020 | Cohen et al. |
| 11,029,315 | B2 | 6/2021 | Yates et al. |
| 11,033,905 | B2 | 6/2021 | Douglas et al. |
| 11,054,059 | B2 | 7/2021 | Douglas et al. |
| 11,065,618 | B2 | 7/2021 | Douglas et al. |
| 11,285,475 | B2 | 3/2022 | Knowles et al. |
| 11,285,481 | B2 | 3/2022 | Douglas et al. |
| 11,298,699 | B2 | 4/2022 | Zhang et al. |
| 2005/0266582 | A1 | 12/2005 | Modlin et al. |
| 2008/0218753 | A1* | 9/2008 | Chang ............... B01L 3/502761 356/337 |
| 2008/0290037 | A1 | 11/2008 | Liu |
| 2009/0136948 | A1 | 5/2009 | Han et al. |
| 2012/0078531 | A1* | 3/2012 | Lo ...................... G01N 15/1434 702/21 |
| 2013/0017538 | A1 | 1/2013 | Ionescu-Zanetti et al. |
| 2013/0121893 | A1 | 5/2013 | Delamarche et al. |
| 2014/0309782 | A1* | 10/2014 | Sharpe ................... G05D 21/02 700/266 |
| 2015/0232942 | A1 | 8/2015 | Abate et al. |
| 2015/0355077 | A1 | 12/2015 | Tono et al. |
| 2016/0003815 | A1* | 1/2016 | Nelson ............. G01N 33/54366 702/19 |
| 2016/0231223 | A1* | 8/2016 | Wang ........................ B07C 5/02 |
| 2017/0052147 | A1 | 2/2017 | Herling et al. |
| 2017/0241878 | A1 | 8/2017 | Broyer et al. |
| 2018/0028940 | A1 | 2/2018 | Sung et al. |
| 2018/0304252 | A1* | 10/2018 | Wei ........................... B81B 1/00 |
| 2018/0318837 | A1* | 11/2018 | Sulchek ............ B01L 3/502761 |
| 2019/0247853 | A1 | 8/2019 | Douglas et al. |
| 2020/0057045 | A1 | 2/2020 | Fiering et al. |
| 2020/0298236 | A1 | 9/2020 | Knowles et al. |
| 2021/0318330 | A1 | 10/2021 | Yates et al. |
| 2022/0016627 | A1 | 1/2022 | Knowles et al. |
| 2022/0026405 | A1 | 1/2022 | Kartanas et al. |
| 2022/0187242 | A1 | 6/2022 | Mueller et al. |
| 2022/0365075 | A1 | 11/2022 | Knowles et al. |

FOREIGN PATENT DOCUMENTS

| | | | | |
|---|---|---|---|---|
| WO | WO-2010063478 | A1 * | 6/2010 | ............. G01N 15/14 |
| WO | 2015/166247 | A1 | 11/2015 | |
| WO | 2022/038376 | A1 | 2/2022 | |

OTHER PUBLICATIONS

Search Report under Section 17 for GB Application No. 2013125.6 dated Feb. 22, 2021.
International Search Report and Written Opinion for International Application No. PCT/GB2021/052172 dated Nov. 9, 2021.
Written Opinion of the International Preliminary Examining Authority for International Application No. PCT/GB2021/052172 dated Jul. 7, 2022.
Oh et al., Design of pressure-driven microfluidic networks using electric circuit analogy. Lab Chip. Feb. 7, 2012;12(3):515-45. doi: 10.1039/c21c20799k. Epub Dec. 16, 2011.

* cited by examiner

H-TYPE FILTER DEVICE FOR ANALYSING A COMPONENT

RELATED APPLICATIONS

This Application is a national stage filing under 35 U.S.C. § 371 of International Patent Application Serial No. PCT/GB2021/052172, filed Aug. 20, 2021, entitled "H-TYPE FILTER DEVICE FOR ANALYSING A COMPONENT," which claims priority to GB Application Number 2013124.9, filed Aug. 21, 2020; and to GB Application Number 2013125.6, filed Aug. 21, 2020, each of which is hereby incorporated herein by reference in its entirety.

The present invention relates to a device and a method for measuring at least one biophysical property of one or more components and in particular, a method for measuring at least one biophysical property of each component sequentially or simultaneously. The present invention also relates to improvements in initiating a microfluidic circuit on a chip and in particular, the present invention relates to a method and apparatus for optimising capillary filling of a microfluidic circuit to improve the accuracy and/or precision of sample measurements.

Microfluidic systems are used for the manipulation, processing or analysis of fluid samples. In analytical systems, measurements are typically performed optically with either vision systems or absorption/fluorescence microscopes and are taken while fluids are either flowing or stationary. A well-known analytical microfluidics technique is diffusional sizing, which uses an H-filter configuration.

In diffusional sizing, measurements are taken continuously while fluids are flowing. Microfluidic diffusional sizing (MDS) is a method which is used to measure the size of particles based on the degree to which they diffuse within a microfluidic laminar flow. Micron-scale measurements of molecular diffusivity have been shown to be a highly sensitive approach to define the sizes of proteins and to bring together the benefits of label-based and label-free methods.

Detection regions in microfluidic devices generally consist of an expansion of the fluidic channel. This is intended to increase the volume of fluid available for optical detection in a given area, which increases the sensitivity of the system. Common microfluidic devices are known to be prone to air entrapment during priming or bubble formation, which leads to inaccurate and/or imprecise measurements.

Microfluidic systems are highly portable, cost effective, and can easily be integrated into sensing platforms with potential applications in personalised medicine. The ability to process large numbers of samples is a common requirement for analytical users. A solution to this throughput requirement is to run multiple samples in parallel on separate microfluidic circuits. To perform optical detection on all circuits, it would be necessary to either observe all circuits simultaneously or near simultaneously, which requires complex and costly optical systems.

Therefore, there is a requirement to provide an apparatus and method to help lower production and development costs for the manufacturer. In particular, it would be desirable to provide an apparatus and method that reduces the complexity of the apparatus required to undertake the measurements.

Furthermore, it is also desirable to provide a suitable channel geometry that increases optical accuracy and sensitivity by minimising the amount of background signal caused by the chip material and maximising the detection volume available for a given optical detection area. Thus, there is a demand for providing a cost-efficient method for the operator to perform optical detection of the sample.

Additionally or alternatively, a user would often consider the background signal during measurements since the background signal can interfere with sample measurements and therefore, it can lead to inaccurate and/or imprecise measurements. For example, a high signal to background noise ratio within the microfluidic device can distort sample measurements of the sample and lead to inaccurate and/or imprecise detection or analysis of the sample.

In current procedures, a sample fluid flow and a blank fluid flow can be loaded into the microfluidic device with the H-filter configuration. A junction exists within the microfluidic device that brings the sample and blank fluid flows into contact. If the auxiliary fluid flow reaches the junction before the sample fluid flow for example, then it is possible that an air trap is formed and thus, this would render the microfluidic chip defective.

Therefore, it is desirable to provide a suitable method and apparatus to take into account the background signal during sample measurements in order to improve the accuracy, precision and sensitivity of detecting samples within the microfluidic device. Thus, there is a requirement for providing a solution for the operator to load the fluids into the microfluidic device and subtract or remove the background signal from sample measurements.

Furthermore, it is also desirable to provide a suitable method and apparatus to fill the microfluidic circuit or device with fluids that avoids or reduces the risk of bubbles forming within the channels of the microfluidic circuit.

It is against the background that the present invention has arisen.

According to an aspect of the present invention, there is provided a flow apparatus for measuring at least one biophysical property of one or more components. The apparatus comprises one or more microfluidic devices. Each microfluidic device comprises: a sample channel having a sample inlet port for introducing a sample fluid flow comprising one or more components at a first flow rate into an elongate distribution channel, an auxiliary channel having an auxiliary inlet port for introducing an auxiliary fluid flow at a second flow rate into the elongate distribution channel. The distribution channel is configured to enable a lateral distribution of the components from the sample fluid flow into the auxiliary fluid flow. Each microfluidic device further comprises two or more capillary channels provided downstream and in fluid communication with the distribution channel, at least one outlet port provided downstream of each of the capillary channels. The sample inlet port and/or the outlet port further comprises an expansion feature between the channel and the corresponding port, whereby the expansion feature comprises a tapered section adjacent to the channel and a curved section adjacent to the port. The apparatus further comprises a switchable pressure source configured to control the flow of the fluids through the channels; and a detector configured to detect and measure at least one biophysical property of the or each component sequentially or simultaneously in each of the capillary channels and/or outlet ports on the microfluidic device.

The apparatus, in embodiments wherein it comprises a plurality of microfluidic devices, may combine some aspects of each microfluidic device. For example, the auxiliary channel from each device may originate from a single auxiliary channel that supplies the apparatus as a whole. Furthermore, the capillary channels in the microfluidic device may be combined at a single outlet port for that device. Additionally or alternatively, the outlet ports may be common between multiple devices within the same apparatus. This is only applicable to embodiments in which the detector detects in the capillary channels and/or detection chambers, rather than the ports. A single vacuum source can be connected to the apparatus and this is more easily achieved if all of the devices are provided with a single outlet port.

The expansion feature is designed to bring the sample and auxiliary fluid flows together without bubbles.

In some embodiments, the apparatus may further comprise a flow guide that extends around at least part of the perimeter of the sample inlet port and/or each of the outlet ports.

In some embodiments, the auxiliary inlet port may further comprise an expansion feature between the auxiliary channel and the corresponding inlet port.

In some embodiments, the auxiliary inlet port may include a flow guide that extends around at least part of the perimeter of the auxiliary inlet port.

According to another aspect of the present invention, there is provided a flow apparatus for measuring at least one biophysical property of one or more components, the apparatus comprising a plurality of microfluidic devices, each device comprising: a sample channel having a sample inlet port for introducing a sample fluid flow comprising one or more components at a first flow rate into an elongate distribution channel, an auxiliary channel having an auxiliary inlet port for introducing an auxiliary fluid flow at a second flow rate into the elongate distribution channel, wherein the distribution channel is configured to enable a lateral distribution of the components from the sample fluid flow into the auxiliary fluid flow; two or more capillary channels provided downstream and in fluid communication with the distribution channel; an outlet port provided at the termination point of each of the capillary channels; a switchable pressure source configured to control the flow of the fluids through the channels; and a detector configured to detect and measure at least one biophysical property of the or each component sequentially or simultaneously in each of the capillary channels and/or outlet ports on the microfluidic device.

According to another aspect of the present invention, there is provided a method for measuring at least one biophysical property of one or more components. This method may comprise the steps of: introducing a sample fluid flow comprising one or more components into an elongate distribution channel at a first flow rate, introducing an auxiliary fluid flow into the distribution channel at a second flow rate, providing, in the distribution channel, a lateral distribution of the component(s) from the sample fluid flow into the auxiliary fluid flow until a steady state distribution is reached, separating at least a part of the steady state fluid flow into two or more capillary channels downstream of the distribution channel, stopping the flow of the fluids at a pre-determined time after the steady state distribution has been reached; and measuring at least one biophysical property of the or each component sequentially or simultaneously in each of the capillary channels on a microfluidic chip.

This invention provides a method and device for analysing samples in a fluid primarily through the use of diffusive sizing, although other techniques may be applicable. The sample can be a blood sample, plasma sample, serum sample, cerebro-spinal fluid sample, urine sample, saliva sample, a sputum sample or any other aqueous sample.

The method is performed on a device that comprises one or more H-filters and a fluid control system that enables flow to be stopped so that analysis can be performed at a later time. This is advantageous because it provides a cost-efficient method for the operator to perform optical detection of the sample. In addition, apparatus and method of the present invention may also help lower production and development costs for the manufacturer. This method also reduces the complexity of the apparatus required to undertake the measurements because the measurements are taken sequentially. The method of the present invention enables multiple H-filters to be mounted on a chip with all of the H-filters being accessed by one or more optical systems that address each capillary flow from each H-filter sequentially.

In some embodiments, the apparatus can be used to characterise a component such as a biomolecule where the biomolecule is a protein, a peptide, an exosome, an antibody or an antibody fragment thereof, a nucleotide such as DNA or DNA piece, RNA or mRNA, a protein-binding molecule such as a protein linker, a polysaccharide; an antibody, a polypeptide, a polynucleotide In some embodiments, the antibody is an allo-antibody, an autoantibody or an antibody raised against an external antigen. The term “allo-antibody” in this context is used to refer to an antibody that recognises foreign molecules, such as HLA, within the field of organ transplantation.

In some embodiments, the biomolecule is a multi-biomolecule mixture. In some embodiments, the biomolecule may be an affinity reagent such as an antibody, a single domain antibody or an aptamer. In some embodiments, the multi-biomolecule mixture comprises an antibody and an antigen. In some embodiments, one biomolecule in the multi-biomolecule mixture can be labelled or at least two or more biomolecules can be labelled. In some embodiments, the antibody or other affinity reagent can be labelled in order to detect other biomolecules of interest. The label may be a fluorescent label or a latent label. In some cases, for instance where the antibody of interest is mixed with other antibodies in a sample, it is preferable for the antigen to be labelled.

Within the context of this specification, the term “stopping the flow of fluids” means that the flow rate through all of channels is substantially zero, including the distribution channel and the capillary channels. This means that there is essentially no bulk fluid flow through any channel of the device. In one embodiment this is effected by removing any externally applied pressure differences between inlet and outlet ports. Depending on the detection taking place, a very low level of movement, in the region of 1-100 nl per hour could still occur and may be negligible compared to the detection volume. Lateral distribution of the component may continue in the distribution channel. For example, diffusion may still continue, but since the steady state fluid flows have been split at the end of the distribution channel, the concentration in each downstream capillary channels remains constant. For the fluid flow to be “stopped” the bulk flow must be an order of magnitude less than the changes arising laterally from diffusion.

Capillary channels are provided downstream from the distribution channel so that the analysis of the sample can be performed at a location well beyond the end of the distribution channel. The analysis of the sample within the capillary channels is advantageous as the detection step is not interfered with by the lateral distribution of the component or the separation step that may continue in the distribution channel upon stopping the flow. The biophysical properties of the component can be measured in its native state as no label is required to perform this method.

As an example, the diffusivity of the component can be analysed within the capillary channels. By analysing the diffusivity properties of the components within the capillary channels well beyond the end of the distribution channel, the user would know that the diffusion process would not affect the detection and measurement would therefore be more accurate.

There are five possible methods of detection as follows: post separation labelling of components which may require dye addition beyond the distribution channel and before the detection region; detecting the intrinsic fluorescence of one or more components; detecting the absorption of one or more components, detecting the amount of scattering of one or more components, and pre-labelling the sample with a dye prior to separation.

Where the intrinsic (or internal) fluorescence of one or more components is detected, the method may include, for example, detecting the fluorescence of aromatic residues such as Tryptophan on native proteins. No label is required in this approach as it's the fluorescence of the native protein that is detected.

Additionally or alternatively, there may be pre-labelling the samples with a dye i.e. before separation of the sample. An advantage of pre-labelling is that it typically allows for more sensitive detection compared to intrinsic fluorescence or absorption measurements. Furthermore, pre-labelling is applicable to any of these methods as the analysis can be performed in-solution. Performing in-solution measurements is more representative of biological conditions than analysis in denaturing gels or on surfaces.

Detection within the capillary channels can be performed well beyond the end of the distribution channel, for example in a reservoir, to allow larger detection volumes to be collected, which can enhance the sensitivity for detecting components of interest.

The method can be used to perform multiple start-stop analyses of at least one component. This is advantageous as it enables time-lapse experiments to be carried out. In particular, this may enable monitoring the size of proteins over long time scales such as for aggregation studies or investigating slow interaction, assembly or disassociation processes.

Stopping the flow of the fluids may occur at any pre-determined time since the commencement of the assay and the stop may have a duration of between 10 seconds to 5 hours. In some embodiments, stopping the flows of fluids may occur for 10 seconds, 30 seconds or it may occur for 1, 2, 4, 5, 7 or 10 minutes. Stopping the flow of fluids may be as low as 10 seconds if doing channel or chamber detection of small (0.5 nm) molecules. Additionally or alternatively, stopping the flow of fluids at a pre-determined time may be up to 5 minutes if doing well detection chamber (port detection) for collecting larger volume of larger molecule (30 nm) (slower flow rate). Additionally or alternatively, stopping the flow of fluids at a pre-determined time may be up to 5 hours for following slow processes such as aggregation reactions.

As disclosed in the present invention, and unless otherwise specified, the term "port" refers to a location at which the microfluidic device can be accessed externally. In other words the port provides an interface between the chip and the surrounding environment.

Port detection is not universally appropriate for a number of reasons including the effect of the presence of bubbles on detection; the presence of concentration gradients within a port and the presence of unwanted material that flows through prior to the sample. However, by careful selected of the geometry of the port, some of these issues can be overcome, making port detection a preferable detection regimen. The use of port detection has the advantage that there is a considerable volume of fluid present in the port and therefore the ratio of sample signal to background coming from the material of the device itself is increased, i.e. the background detection is less for the port than for other geometries within the device as the optics will encounter less of the plastic from which the device is formed.

Because the device is filled by capillary action and the fluid flow is controlled tightly to enable the flow to be stopped and started, the volume of unwanted material that precedes the sample is known and constant. As a result, it provides a systematic error in the detection readings that can be corrected for in a comparatively simple manner. Furthermore, the volume of unwanted material that precedes the sample may be very small such as nl volumes and may not affect the detection readings appreciably.

The channel sizes required to facilitate capillary filling are such that the system volume is quite small in comparison with a similar geometry where capillary filling is not required or expected. This, in turn, minimizes the volume of unwanted material making the contribution of this material a smaller proportion of the detected signal.

The selection of the pre-determined time at which the stop is initiated depends on the state of the assay that is desired. If a stop is instigated relatively shortly after the commencement of the assay then the assay will still be on going at the time of the stop. Conversely, if a stop is instigated some time after the assay has commenced then a steady state condition may have been reached in which lateral diffusion has occurred and reached an equilibrium state.

Steady state distribution may occur by diffusion or electrophoretically. Steady state distribution may be defined to mean that the distribution of a component across a fluid flow takes place at a constant rate—that is, once steady state distribution is achieved the number of atoms (or moles) crossing a given interface (the flux) is constant with time.

As disclosed in the present invention herein, unless otherwise defined, the term "flux" is referred to as the rate of flow of a property per unit area. In some embodiments, a steady state distribution has a constant flux.

The detector may measure directly at least one biophysical property of the or each component sequentially or simultaneously in each of the capillary channels on a microfluidic chip or it may require the measurement of a proxy for the distribution and infers a biophysical property of the or each of the component from the proxy measurement.

In some embodiments, simultaneous measurements may comprise providing at least two sets of detectors to measure at the same time the biophysical properties of the component(s) across the capillary channels on the microfluidic chip.

In some embodiments, sequential measurements may comprise providing a detector to measure the biophysical property of the component in a capillary channel and then moving the same detector to measure the biophysical property of the component(s) in another capillary channel.

In some embodiments, the step of flowing the sample fluid flow and the auxiliary fluid flow through the distribution channel is induced by the establishment of a pressure gradient across the distribution channel. A pressure source (vacuum or positive pressure) may be provided to induce a uniform/constant pressure-driven flow of the sample and auxiliary fluids into the microfluidic chip. In some embodiments, the pressure source can be a pump.

In some embodiments, the first flow rate and the second flow rate may be substantially the same. The first flow rate in a sample channel and the second flow rate in an auxiliary channel can be the same in order to provide a constant flow rate of the sample and the auxiliary fluid flows through the distribution channel. Alternatively, the first and second flow rates through the sample and auxiliary channels may be different.

In some embodiments, a portion of each of the capillary channels may be arranged in a serpentine or tortuous configuration. The tightly compacted capillary channels increase sensitivity and signal to noise ratio. In some embodiments, the serpentine or tortuous configuration increases the flow area over which measurements can be taken to detect the component with a detector. This can be advantageous because it provides an increased volume of the capillary channel to be detected with a single detection spot and thus, this may enhance the sensitivity for detecting components of interest.

Furthermore, the tortuous configuration of the capillary channel may also help reduce or eliminate air bubbles within the channel.

In some embodiments, a portion of each of the sample and/or auxiliary channels are arranged in a serpentine or tortuous configuration.

In some embodiments, the spacing between each segment or region of the tortuous portion of the capillary channel may be minimised. In some embodiments, the spacing between the segments or regions of the tortuous part of the capillary channel may be constant or the spacing may vary along the entire tortuous region of the capillary channel. In some embodiments, the tortuous portion comprises a serpentine configuration. In some embodiment, the tortuous region comprises a helical configuration.

In some embodiments, the step of stopping the flow of fluids may be achieved by using a releasable valve. A pressure release valve may be provided to equilibrate pressure across the flow device. For example, the pressure release valve may be provided to equilibrate the sample channel, auxiliary channel, distribution channel and/or the downstream capillary channels.

"On-chip" resistances of the channels may be provided to control the flow of fluids through the channels. In some embodiments, the resistance provided downstream of the distribution channel may be greater than the resistance provided upstream from the distribution channel. Providing a greater resistance downstream of the distribution channel compared to the resistance upstream of the distribution channel can help reduce or avoid sample adhesion effects.

In some embodiments, the resistance provided upstream of the distribution channel may be greater than the resistance provided downstream from the distribution channel. Upstream resistance can be the dominant factor in determining the flow balance within the distribution channel. Therefore, it may be possible to have only minimal resistance downstream. Minimising the on-chip resistance is important because the small geometries necessary for on-chip resistance are challenging to manufacture.

In some embodiments, the resistance of the sample channel, auxiliary channel, the distribution channel or the two or more downstream capillary channels may be dictated by one or more of the following: the cross sectional area of the channel, the aspect ratio of the channel, the length of the channel and/or the surface roughness of the channel.

In some embodiments, the method for measuring at least one biophysical property of one or more components may further comprise two or more ports in fluid communication and downstream from the two or more capillary channels. Each of the capillary channels may further comprise a port, which is in fluid communication and downstream from the capillary channel.

In some embodiments, the method for measuring at least one biophysical property of one or more components may further comprise two or more detection chambers in fluid communication and downstream from the two or more capillary channels.

In some embodiments, the method for measuring at least one biophysical property of one or more components may further comprise the step of measuring at least one biophysical property of the or each component sequentially or simultaneously in each of the ports on the microfluidic chip.

In some embodiments, detection of the components may be performed in externally accessible ports for extraction of the sample or addition of further components.

The amount of the component of interest may be higher in the port compared to the amount in the capillary channels. Therefore, measuring the component in the port may provide a higher sensitivity of detection.

In some embodiments, the method for measuring at least one biophysical property of one or more components may further comprise the step of measuring at least one biophysical property of the or each component sequentially or simultaneously in each of the detection chamber on the microfluidic chip.

In some embodiments, the method for measuring at least one biophysical property of one or more components may further comprise an incubating step during the step of stopping the flow of fluids.

In some embodiments, the method for measuring at least one biophysical property of one or more components may further comprise a step of providing a further component to the port. The further component may be a dye which can be added to the components within the port for signal amplification purposes of the component of interest. The dye may be a fluorogenic, enzymatic or DNA labels. Furthermore the dye may be a strong scatterer. The dyes added to the component in the port can bind to the component of interest and require an incubation or thermal cycling step for amplification.

In some embodiments, the method for measuring at least one biophysical property of one or more components may further comprise a step of measuring the diffusivity, electrophoretic, diffusophoretic or thermophoretic mobility of one or more of the components.

In some embodiments, the lateral distribution of the component(s) occurs by diffusion. The apparatus and method according to the present invention operates under a laminar flow regime. In laminar flow there is little or no mixing of fluid flows. Components in a solution may move by diffusion but the bulk fluids do not mix. Lateral diffusion can enable measurement of the hydrodynamic radius and inference of other biophysical properties of the component.

In some embodiments, the method for measuring at least one biophysical property of one or more components may further comprise determining the diffusion co-efficient of at least one of the components in the sample fluid flow.

According to a further aspect of the present invention, there is provided a method of operating a microfluidic analysis on a chip according as described above, the method comprising the steps of: providing an auxiliary fluid into the auxiliary port; allowing the circuit to fill via capillary action; detecting a background signal in at least one of the capillary channels; introducing a sample fluid flow to be analysed into the distribution channel; providing, in the distribution channel, a lateral distribution of the component(s) from the sample fluid flow into the auxiliary fluid flow until a steady state distribution is reached, separating at least a part of the steady state fluid flow into two or more capillary channels downstream of the distribution channel, detecting a sample signal relating to the sample to be analysed in at least one of the capillary channels; and correcting the detected sample signal by subtracting the background signal.

Alternatively, the method may comprise the steps of: detecting a background signal in at least one of the capillary channels; providing a sample into the sample port; allowing the circuit to fill via capillary action; introducing a sample fluid flow to be analysed into the distribution channel; providing, in the distribution channel, a lateral distribution of the component(s) from the sample fluid flow into the auxiliary fluid flow until a steady state distribution is reached, separating at least a part of the steady state fluid flow into two or more capillary channels downstream of the distribution channel, detecting a sample signal relating to the sample to be analysed in at least one of the capillary channels; and correcting the detected sample signal by subtracting the background signal.

By introducing a fluid into the circuit through a single input, the fluid flows throughout the system pushing out air from all of the channels. This ensures that no air bubbles are trapped in the system. This is very important because an air bubble can block a microfluidic channel. Introducing fluid through two separate inlets simultaneously risks bubbles being trapped at the junction between the sample and system fluid channels and the distribution channel preventing the fluids from being brought together as intended.

By introducing system or auxiliary fluid throughout the microfluidic circuit, a background signal can be detected at the outlet, enabling the sample signal to be corrected to remove the background signal, thereby improving the quality of the data obtained. It is thus preferable to prime the circuit with the auxiliary fluid. In cases where there is little diffusion it is furthermore preferable to have the circuit primed with auxiliary fluid rather than sample fluid since the priming fluid may lead to an additional signal in the capillary channel, detection chamber or outlet port that records the amount of sample that has diffused into the auxiliary fluid.

By taking into account the background signal in at least one of the capillary channels, the sample adhesion measured in the first capillary channel can be compared to the sum of the sample adhesion measured in the other capillary channels.

This protocol may reduce the volume of fluid used in comparison with a state of the art system in which excess volume of system fluid is flushed through the circuit. In this protocol, the volume of system fluid used prior to the introduction of the sample is equal to the volume of the microfluidic circuit. This volume may be in the region of 120 nl. This is useful in contexts where the system fluid is expensive or limited in supply.

In some embodiments, using the methodology of flushing with an excess of system fluid, the system fluid is typically water or an aqueous solution such as a buffer. In one embodiment the system fluid is phosphate-buffered saline (PBS). In another embodiment the auxiliary fluid is phosphate-buffered saline provided with a surfactant such as Tween20 (PBST). However, if a smaller volume of system fluid could be used, then it can be more achievable to undertake protocols where the system fluid is bespoke for a given sample fluid such as providing a system fluid that is matched in viscosity with the sample fluid. Alternatively, or additionally, this is advantageous in circumstances in which the same test is repeated with a plurality of different system fluids. For example, repeating a test with a plurality of system fluids of different pH values.

In some embodiments, the viscosity of the auxiliary fluid can be matched with the same viscosity as the sample fluid and vice versa. For example, the viscosity of the auxiliary fluid can be within 20%, 10% or 5% of the viscosity of the sample fluid. In particular, the system fluid may be human serum or plasma. In another embodiment, the system fluid may be a buffered solution mimicking the visco-elastic and optical properties of human serum or plasma as well as their ion concentrations and pH.

In some embodiments, the viscosity and the background signal of the sample fluid may be measured by recording the liquid fill level and total fluorescence of each port before and after the experiments. For example, with a z-scan of the back-reflected light and a fluorescence measurement of the content of a detection area, such as a port. The differences in fill level give the volumes that left and/or entered each port and together with the geometrical chip resistance the viscosity can be calculated. Together, the viscosity and background signal can be determined and used to correct the backgrounds for any experiments. This correction may also be implemented for different circuits, where the viscosity and background signal is determined in one circuit, and the correction is effected in one or more other circuits.

In some embodiments, a negative pressure can be applied simultaneously or in a staggered fashion on the channels, such that "diffusion" of components is completed in one channel by the time the measurements, analysis and/or detection of the previous channel is completed. Thus, this is advantageous because it enables shorter waiting times for the later microfluidic devices/circuits to be in their final state before readout. Therefore, this reduces or lowers the risk of evaporation of liquid within the channels.

In another aspect of the present invention as disclosed herein, there is provided a flow apparatus for measuring at least one biophysical property of one or more components, the apparatus comprising: a device comprising a sample channel for introducing a sample fluid flow comprising one or more components at a first flow rate into an elongate distribution channel, an auxiliary channel for introducing an auxiliary fluid flow at a second flow rate into the elongate distribution channel, wherein the distribution channel is configured to enable a lateral distribution of the components from the sample fluid flow into the auxiliary fluid flow after a steady state distribution is reached; two or more capillary channels provided downstream and in fluid communication with the distribution channel such that at least a part of the steady state fluid flow that has been reached moves into each of the capillary channels, a switchable pressure source configured to control the flow of the fluids through the channels; and a detector configured to detect and measure at least one biophysical property of the or each component sequentially or simultaneously in each of the capillary channels on the device.

The device may be a fluidic device. In some embodiments, the device may be a microfluidic chip.

In another aspect of the present invention as disclosed herein, there is provided a flow apparatus for measuring at least one biophysical property of one or more components, the apparatus comprising: a sample channel for introducing a sample fluid flow comprising one or more components at a first flow rate into an elongate distribution channel, an auxiliary channel for introducing an auxiliary fluid flow at a second flow rate into the elongate distribution channel, wherein the distribution channel is configured to enable a lateral distribution of the components from the sample fluid flow into the auxiliary fluid flow after a steady state distribution is reached; two or more capillary channels provided downstream and in fluid communication with the distribution channel such that at least a part of the steady state fluid flow that has been reached moves into each of the capillary channels, a switchable pressure source configured to control the flow of the fluids through the channels; and a detector configured to detect and measure at least one biophysical property of the or each component sequentially or simultaneously in each of the capillary channels on a microfluidic chip.

In some embodiments, upstream and/or downstream resistances may be provided solely on the microfluidic chip as a result of the size and configuration of the channels. In some embodiments, the value of the resistance downstream of the distribution channel is greater than the value upstream of the distribution channel. This can be advantageous because the capillary channel's tortuous configuration can serve as a detection area. Furthermore, a small upstream resistance allows for fast priming through the auxiliary and sample ports. Additionally, a small upstream resistance reduces the risk of sample adhesion in the upstream part of the circuit. Low risk of sample adhesion is beneficial because sample that is adhering to the surface of a channel may not flow into the detection region and thus the measured signal may be lower than expected. The value of the resistance can be influenced by the shape configuration and/or the width, height and length of the channel.

For example, the width of the channel i.e. sample, auxiliary and/or capillary channels can be between 15 to 100 μm, or it may be 20, μ, 30, 35 or 40 μm. The height of the channels can be between 15 to 100 μm or it may be 20, 25, 30, 35 or 40 μm. The length of the channel can be between 10 to 200 mm, or it can be 15, 20, 25, 30 or 35 mm. The value of the upstream resistance may be between 10 to 1000 mbar/(μl/min), or it may be 60, 70, 80, 90, 100, 110, 120, 130, 140, 150, 160, 170, 180, 190, 200, 210, 220, 230 or 240 mbar/(μl/min). The value of the downstream resistance may be between 20 to 2000 mbar/(μl/min), or it may be 125, 150, 175, 200, 225, 250, 275, 300, 325, 350, 375, 400, 425, 450, 475, 500, 525, 550, 575, 600, 625, 650 or 670 mbar/(μl/min).

The total resistance provided by the channels of the microfluidic device can be used to determine the flow rate of fluids through the channels. In some embodiments, the resistances of the device can be tuned such that it enables a sufficient flow rate of the fluids through the distribution channel at a given application of pressure. Sufficient flow rate may refer to a flow rate at which the amount of diffusion in the diffusion channel leads to an accurately measurable diffusion coefficient. For example, the vacuum pressure that can be applied may be between 0 to 1 bar. Additionally or alternatively, a positive pressure between 0 to 10 bar may be applied to the inlets. It can be advantageous to provide "on chip" resistances within the device because this can help to control fluid flow into and out of the channels.

In a further example, the width of the capillary channels, downstream of the distribution channel, may be approximately 20 μm, the width of the sample and/or auxiliary channels, upstream from the distribution channel, may be approximately 25 μm and the height of the channels can be approximately 40 μm. The length of the sample and/or auxiliary channels, upstream from the distribution channel, can approximately 12 mm. The length of the capillary channels, downstream of the distribution channel, may be approximately 28 mm. The upstream resistance may be approximately 60 mbar/(μl/min) and the downstream resistance may be approximately 300 mbar/(μl/min).

Different resistances between multiple microfluidic devices can lead to a difference in the distribution of flow rates through the channels between each of the microfluidic devices, including how much of the auxiliary and sample fluids get pulled through the microfluidic chip and how much of the fluids can flow through after the diffusion channel. In order to provide a more uniform set of resistances across a plurality of microfluidic devices, pre-measured or batch-characterised resistance values for each microfluidic chip can be carried out to correct the measured size for any changes in flow rates through the channel network.

In some embodiments there may be provided different microfluidic chips that have different geometries of the diffusion channel and/or different resistance values such that as the same pressure a different range of diffusion coefficients can be measured.

In some embodiments, the detector can be configured to move to focus on various detection locations within the chip.

In some embodiments, the detector may be an optical detector which can be configured to measure the fluorescence of a component of interest.

In some embodiments, the diffusion channel, together with the sample channel, the auxiliary channel and the capillary channels, may form an H-filter.

In some embodiments, a portion of each of the capillary channels may be arranged in a serpentine or tortuous configuration.

In some embodiments, the flow apparatus may further comprise a port. The port may be an inlet port, or an outlet port. The port may be provided on the sample or auxiliary fluid inlet. Each port is a feature of the microfluidic system. Each port may be provided with an open geometry so that the meniscus of the sample fluid provides the upper limit of the port volume. This provides an advantage over a closed port which can trap bubbles. The inlet and outlet ports may be provided with corresponding geometries. The ports may have identical geometries. The ports may be provided with an annular ring which may help to dissipate gradients that would otherwise exist across the outlet ports.

In some embodiments, each of the capillary channels further comprises a port. Measuring the concentration, amount or diffusivity of the component in the port can be advantageous because it can provide more volume for measurements and thus, increased sensitivity which provides a more accurate reading.

In some embodiments, the flow apparatus may further comprise a detection chamber. In some embodiments, the microfluidic device may further comprise a detection chamber. In some embodiments, each of the capillary channels may further comprise a detection chamber. In some embodiments, the detection chamber may be a port. For example, detection may take place at the inlet port, the outlet port or both the inlet and outlet port. If the geometry of the inlet and outlet ports is similar, or even identical, this can aid the detection as the contribution of the port at the inlet and the outlet will be substantially the same and therefore can be removed from the data.

In some embodiments, the microfluidic chip as disclosed herein may have a plurality of detection regions. The detection regions may be the detection chamber such as the detection port and/or it may be the serpentine or tortuous portion of a channel such as the serpentine or tortuous portion of the capillary channel.

In some embodiments, the device i.e. microfluidic device may be provided in a dark color such as black to reduce background light and fluorescence.

Additionally or alternatively, the device, such as a microfluidic device may be coated with an anti-adhesion coating to reduce or prevent sample adhesion and thus, give good sensitivity. Sensitivity of around 1 nM can be achieved with ~1 million molecules/mm^2. The coatings could be, but are not limited to, one or more of the following: non-ionic surfactants of ethoxylated polysorbate, or polypropylene oxide, polyethylene oxide, polypropylene oxide. In some embodiments, the anti-adhesion coating is ethoxylated polysorbate.

In some embodiments, the device may comprise an active position-finding guide such as one or more fiducial points which can be utilised to find the detection position, i.e. X, Y and/or Z position, within the port and/or within the tortuous portion of the channel. In some embodiments, the position-finding guide may be one or more ports itself or any other feature of the fluidic circuit itself.

In some embodiments, the active position-finding guide may be configured to locate a detection position within the outlet port. In some embodiments, the position-finding guide to locate a detection position within the outlet port may be the outlet port. Using the active position finding guide at one of the outlet ports can be advantageous as the active-finding guide can locate the exact detection position of the outlet port with greater accuracy. However, it may be a time consuming process to find the location of each outlet port.

Additionally or alternatively, one or more ports can also be utilised to determine the specific locations on the microfluidic device.

In some embodiments, a detector may be provided upstream of the distribution channel, the detector is configured to detect and measure at least one biophysical property of each component in the sample channel. The same detector may then be moved to the downstream of the distribution channel to detect and measure at least one biophysical property of each component in the capillary channels.

In some embodiments, the flow apparatus may further comprise a second detector, the second detector may be configured to detect and measure at least one biophysical property of the or each component. A first detector may be provided upstream of the distribution channel and a second channel may be provided downstream of the distribution channel.

In some embodiments, the flow apparatus may further comprise a second detector provided upstream of the distribution channel, the second detector is configured to detect and measure at least one biophysical property of the or each component in the sample channel.

By providing a second detector upstream from the distribution channel, the background signal can be accounted for in order to provide accurate measurements. The background signal of the system is measured within the auxiliary channel and the background signal can be subtracted from the sample signal measurements in the capillary channels. The detected signal sample at the capillary channels can be corrected by subtracting the background signal.

In some embodiments, the flow apparatus may be provided with a confocal detector. A detection region within the microfluidic device may be at a suitable size for a confocal detection spot encompassing, for example, hundreds of micrometers in each dimension. Using the confocal detector in the port can mean that detection of the biomolecule within the flow is not dependent on liquid fill height, but a significant amount of detection volume is still available for detection. The confocal detector may be configured to detect and measure at least one biophysical property of the or each component within the port and/or within the tortuous portion of the channel(s). The confocal spot may also encompass hundreds of nanometers in each dimension. This may be advantageous to be even less position dependent and to further reduce the background light. A larger confocal spot is advantageous for measuring more fluorescent molecules which may enhance detection sensitivity.

One or more detectors can be part of a detection system. The detection system can be deployed on the flow apparatus for detecting biomolecules of interest within the sample flow. The detector may have multiple wavelengths for (optionally simultaneous) fluorescent readout. For example, two colours, red and green 647 and 488 nm excitation, with emission centered around 670, 680, 690, 700 nm (alternatively: long-pass filtered above 660 nm or 670 nm) or centered around 510, 520, 530, 540 nm (alternatively: long-pass filtered above 500 nm or 510 nm or 520 nm).

Sources of background signal may include, but is not limited to; fluorescence, absorption, reflections and scattering from the auxiliary fluid, chip materials and wider opto-mechanical system. Furthermore, different system fluids may have different background signal level. For example, a protein in water has low background signal, but may not be appropriate. Instead, it may be preferable to index match the auxiliary fluid and the sample fluid so that, for example, differences in viscosity do not impact the readings. As a result, it may be preferable to use serum as the auxiliary fluid, sometimes called a system fluid, despite the fact that serum has a high level of background. Alternatively, it may be preferable to use an auxiliary fluid that shares some of the physical properties with the sample fluid. Specifically, the auxiliary fluid may have substantially the same refractive index, ion concentration, pH, and/or viscosity as the sample fluid.

In some embodiments, a method may be provided for taking accurate measurements from an H-filter by accounting for background signal and sample adhesion. The method may include the following steps: the background signal of the system is measured at the sample channel, the background signal is subtracted from measurements at each of the capillary channels to derive background corrected measurement of distributions ratio. The sample signal measured in the sample channel is measured and compared to the sum of the signal and/or background signal in each of the capillary channels as a correction mechanism for concentration measurements and to determine the level of sample adhesion.

In some embodiments, the detector is configured to determine the at least one biophysical property of the or each component in an area at least one channel's width from the edge of the tortuous portion of the capillary channel.

Locating the detector at least one channel width away from the edge of the tortuous portion of the capillary channel avoids the necessity for highly precise positioning of the chip within the apparatus.

In some embodiments, the tortuous portion of the capillary channel may contain an upstream portion and a downstream portion of substantially equal lengths, and wherein the detector can be configured to measure at least one biophysical property of the or each component in the upstream portion.

The detector can be located in the upstream part of the tortuous portion of the fluid channel i.e. closer to the start of the tortuous region than the end of the tortuous region to maximise the detection of sample that has not been affected by protein adhesion. Hence, this may result in more fluid volume nearer to inlet channels for measurements. In some embodiments, the flow apparatus according to any one of the aspects of the present invention may further comprise a user interface. The user interface is configured to detect the device such as a microfluidic device. In some embodiments, the user interface may have a display panel.

When in use, a chip plate comprising a plurality of microfluidic chips can be inserted into the user interface which detects which microfluidic chips have been used. The display panel then displays this information to the user.

In some embodiments, tags such as an NFC tag can be used to define and show on the user interface which channels have been used. Additionally or alternatively, the NFC tag or other tags could be used to store calibration data to use in resistance-corrections as disclosed herein.

According to another aspect of the present invention, there is provided a chip comprising; a plurality of parallel microfluidic circuits, each circuit comprising: a system fluid inlet channel commencing with a system fluid inlet port through which system fluid can be introduced into the circuit; a sample fluid inlet channel commencing with a sample fluid inlet port through which sample fluid can be introduced into the circuit; wherein the sample inlet port comprises an expansion feature between the sample inlet channel and the corresponding inlet port wherein the expansion feature comprises a tapered section adjacent the channel and a curved section adjacent to the port; a distribution channel in fluid communication with both the system fluid channel and the sample fluid channel; two outlet channels terminating in outlet ports, wherein the outlet channels are in fluid communication with the distribution channel; wherein each of the channels has a maximum width or height no greater than 50 μm; and further comprising connectivity for a vacuum source at each of the outlet ports.

In some embodiments, the curved section of the expansion feature has a radius of between 0.05 mm and 0.4 mm. In some embodiments, the curved section of the expansion feature may have a radius of more than 0.05, 0.1, 0.15, 0.2, 0.25, 0.3 or 0.35 mm. In some embodiments, the curved section of the expansion feature has a radius of less than 0.4, 0.35, 0.3, 0.25, 0.2, 0.15 or 0.1 mm.

In some embodiments, the curved section of the expansion feature has a radius of 0.2 mm.

In some embodiment the sample port further comprises a flow guide that extends around at least part of the perimeter of the sample inlet port. In some embodiments, each inlet port includes a flow guide that extends around at least part of the perimeter of the inlet port. In some embodiments, each outlet port includes a flow guide that extends around at least part of the perimeter of the outlet port.

In some embodiments, each inlet port includes an expansion feature between each inlet channel and the corresponding inlet port wherein the expansion feature comprises a tapered section adjacent the channel and a curved section adjacent to the port. In some embodiments, each outlet port includes an expansion feature between each outlet channel and the corresponding outlet port wherein the expansion feature comprises a tapered section adjacent the channel and a curved section adjacent to the port.

The chip can be specific to microfluidic regimen where the channels are selected so that capillary filling is possible as capillary forces predominate. The maximum dimension of the channels is selected such that the channels operate in this regimen. One of the aims of the present invention as disclosed herein is to ensure rapid filling of the circuits to increase the efficiency of the device. For example, the circuit should be capable of a complete capillary fill in less than 5 minutes, preferably between 5 and 90 s.

The expansion feature can also be beneficially designed so that it provides a flatter/smooth meniscus for the sample fluid (when introduced) to the system or auxiliary fluid, so as to avoid air bubbles trapped between the two menisci. A straight capillary with abrupt end has a higher tendency to trap air bubble in between the menisci.

In addition, the expansion feature has a tapered section expanding from the channel towards the port and then a curved or radiused section that expands further from the end of the tapered section as it reaches the port. The radiused section is shaped to follow the radius of a circle that has a radius of between 0.05 mm and 0.4 mm. This enables the port to fill under capillary forces as the fluid would otherwise stop on reaching a large step in cross sectional area as presented between the channel and the port. In the absence of the radiused section of the expansion feature, there would be a stepped transition between the tapered section of the expansion feature and the port.

This can result in the pinning of the meniscus at that point which may result in bubbles being formed. This is of particular concern at the sample inlet because a preferred operation regimen is to fill the entire chip with system fluid and then, subsequently, to introduce the sample. In the absence of the radiused section of the expansion feature, bubbles may form between the sample fluid and the system fluid in the vicinity of the expansion feature at the commencement of the sample fluid channel. These bubbles may be sufficient to block the sample inlet channel which could prevent the sample fluid from entering the distribution channel. Even if the channel was not completely blocked by the bubble and the sample fluid did succeed in flowing into the distribution channel, the bubble would interfere with detection downstream of the distribution channel.

The efficiency of flow from the radiused part of the expansion feature into the port is further assisted by the provision of a flow guide which extends around at least part of the perimeter of the port and further acts to improve fluid flow between the port and the channel providing an initial flow pathway for the fluid around the perimeter of the port. If the port has a circular cross section, then the flow guide may be an annulus. The dimensions of the annulus can be chosen to conform closely to the channel dimensions. The flow guide may not be provided around the entire perimeter of the port, but instead it may be provided only in the region of the port that is adjacent to the channel entry point.

The provision of the flow guide also contributes to the homogeneity of the fluid in the outlet port. The flow guide provides a preferential flow pathway along which the port commences filling. Once the flow guide has filled, the remainder of the port will fill and there will be no appreciable concentration gradient across the port. This is important when a signal should be detected in a port.

The system fluid channel, sample fluid channel, distribution channel and two outlet channels can take a classic H-filter configuration.

In the distribution channel the sample fluid comes into contact with the system fluid and a distribution is developed by diffusion.

The provision of pressure management connectivity at the outlet channels reduces the risk of contamination that would be present if connectivity were to be provided at the inlets to push the fluid through the circuit rather than pulling to through from the outlets.

In some embodiments, each of the channels can be provided with a coating configured to both prevent sample adhesion and enable efficient filling of the circuit.

The choice of coating is critical to enable the desired rapid filling without degrading the sample by protein adhesion.

In some embodiments, the channels have a maximum dimension of 40 μm.

In some embodiments, the channels have an extent of up to 25 μm perpendicular to their maximum dimension.

The dimensions are tightly controlled to enable capillary filling of the entire chip within a reasonable time frame, i.e. within one minute. For example, a 25 μm by 40 μm channel configuration may fill within one minute, but if the 25 μm dimension were to be increased to 30 μm the fill would take too long.

Furthermore, the volume of the circuit will also change considerably when the dimensions are changed, resulting in a much longer fill time for larger channels. Smaller channels lead to higher hydrodynamic resistances which may reduce the fluid flow rate in the diffusion channel during operation.

Decreasing the dimensions of the channel decreases the surface area of the channel walls but increases the surface-to-volume ratio and therefore increases the risk of surface adhesion occurring.

The provision of channels with a small cross sectional area contributes to efficient capillary filling, but also ensures that port detection is a viable option, because the entire chip can be filled with system fluid prior to the introduction of the sample and yet the volume of system fluid is still sufficiently low that it does not preclude meaningful measurements in the outlet ports.

In some embodiments, the coating can be hydrophilic. In some embodiments, the coating can be hydrophobic.

In some embodiments the auxiliary or sample fluids may contain solvents or additives such as surfactants or ethanol that reduce the contact angle between the fluid and the channel surface. A low contact angle is advantageous to aid capillary priming.

In some embodiments, the chip may comprise eight microfluidic circuits. For the purpose of this invention, the skilled person would appreciate that any number of microfluidic circuits can be provided on one chip. For example, the chip may comprise more than eight microfluidic circuit. Alternatively, the chip may comprise less than eight microfluidic circuits.

In some embodiments, each outlet port can be an open port. The provision of an open port halts the flow of the fluid during priming. Furthermore, there is no pressure build up within the open port. The fluid flow velocity has previously been slowed by the expansion feature, but the flow may be halted completely by the provision of an open port, especially during the priming process between the sample and auxiliary channels and/or between the auxiliary and capillary channels.

In some embodiments, the expansion feature may be configured to contain at least one reagent. The reagent may be provided via the port adjacent to the expansion feature.

This enables completely autonomous filling of the chip because the chip will fill with system fluid until it reaches the expansion feature comprising the reagent. The reagent will then contact the system fluid and, once the expansion feature is entirely filled with a mixture of the system fluid and the reagent, capillary action flow will fill the chip incorporating the reagent from the expansion feature.

In the context of the present invention, and unless otherwise specified, the term "reagent" can also mean the sample fluid.

In some embodiments, the expansion feature of at least one of the outlet port may be configured to form a mixture of the sample and auxiliary fluid flows as the sample and auxiliary fluid flows contact with each other at the edge of the expansion feature. The contact between the sample and auxiliary fluids at the edge of the expansion feature ensures that there is no air between the fluids and hence, no bubbles are generated within the channels.

In some embodiments, the system fluid channel can be provided with a hydrophilic coating. The provision of a hydrophilic surface coating ensures that the surface is wetted by the system fluid ensuring that no bubbles are entrained during loading of the system fluid into the system fluid channel.

In some embodiments, the channels provided upstream of the distribution channel can be provided with a hydrophilic coating. Additionally or alternatively, the channels provided downstream of the distribution channel can be provided with a hydrophobic coating.

In some embodiments, the sample fluid channel may be provided with a hydrophilic coating. The provision of a hydrophilic surface coating ensures that the surface is wetted by the sample fluid ensuring that no bubbles are entrained during loading of the sample fluid into the sample fluid channel.

In some embodiments, each of the channels of the microfluidic device may be provided with a port and the surface of the port can be roughened.

In some embodiments, the system fluid channel may be provided with a port through which system fluid can be loaded into the system fluid channel and wherein the surface of the port can be roughened. In some embodiments, the sample fluid channel may be provided with a port through which sample fluid can be provided and where the system fluid can meet the sample fluid through capillary action without bubble formation between the fluids and wherein the surface of the port can be roughened.

Roughening the surface of the port ensure that the system fluid moves uniformly into the port.

In some embodiments, the vacuum source is a pump such as a syringe pump or a piston pump, a rotary pump, a diaphragm pump, or a peristaltic pump.

According to another aspect of the invention, there is provided a method of initiating a microfluidic circuit on a chip according to a previous aspect of the present invention. The method comprising the steps of: capillary filling the entire microfluidic circuit via the system fluid channel with a system fluid; detecting a background signal in at least one of the channels or ports; introducing a fluid containing a sample to be analysed through the sample fluid channel; connecting a vacuum to the outlet to draw the fluids through the microfluidic circuit; detecting a sample signal relating to the sample to be analysed in at least one of the outlet channels; and correcting the detected sample signal by removing the background signal.

By introducing fluid into the circuit through a single input, the fluid flows throughout the system pushing out air from all of the channels. This ensures that no air bubbles are trapped in the system. This is very important because an air bubble can block a microfluidic channel. Introducing fluid through two separate inlets simultaneously risks bubbles being trapped at the junction between the sample and system fluid channels and the distribution channel preventing the fluids from being brought together as intended.

By introducing system fluid throughout the microfluidic circuit, a background signal can be detected at the outlet, enabling the sample signal to be corrected to remove the background signal, thereby improving the quality of the data obtained.

This protocol reduces the volume of fluid used in comparison with a state of the art system in which excess volume of system fluid is flushed through the circuit. In this protocol, the volume of system fluid used prior to the introduction of the sample is equal to the volume of the microfluidic circuit. This volume may be in the region of 10 nl to 250 nl, for example 120 nl. This is useful in contexts where the system fluid is expensive or limited in supply.

In current practice, using the methodology of flushing with an excess of system fluid, the system fluid is typically water. However, if a smaller volume of system fluid could be used, then it will be more achievable to undertake protocols where the system fluid is bespoke for a given sample fluid such as providing a system fluid that is matched in viscosity with the sample fluid. Alternatively, or additionally, this is advantageous in circumstances in which the same test is repeated with a plurality of different system fluids. For example, repeating a test with a plurality of system fluids of different pH values.

In some embodiments, the entire chip would be filled with an auxiliary fluid, such as a buffer solution or water, before the main experiment to allow background measurements to be taken. This can help improve the accuracy of sample detection as the background value can be subtracted from the sample measurements.

Moreover, the chip as disclosed herein enables background measurements to be taken throughout the chip and avoids the risk of bubble traps. Hence, the present invention as described herein enables bubble-free filling of microfluidic circuits which helps improve performance reliability of the microfluidic circuit as well as improving the accuracy of sample measurements.

The invention will now be further and more particularly described, by way of example only, and with reference to the accompanying drawings, in which:

FIG. 1 shows a flow device for measuring at least one biophysical property of one or more components according to the present invention;

FIG. 2 provides an alternative embodiment of the flow device for measuring at least one biophysical property of one or more components according to FIG. 1;

Figure 12:
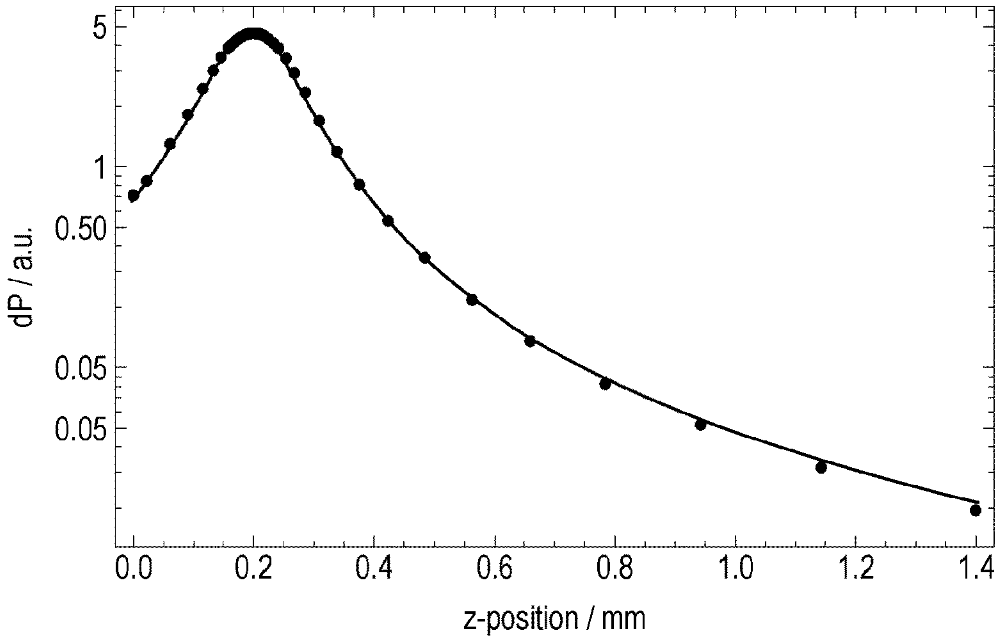
Figure 13:
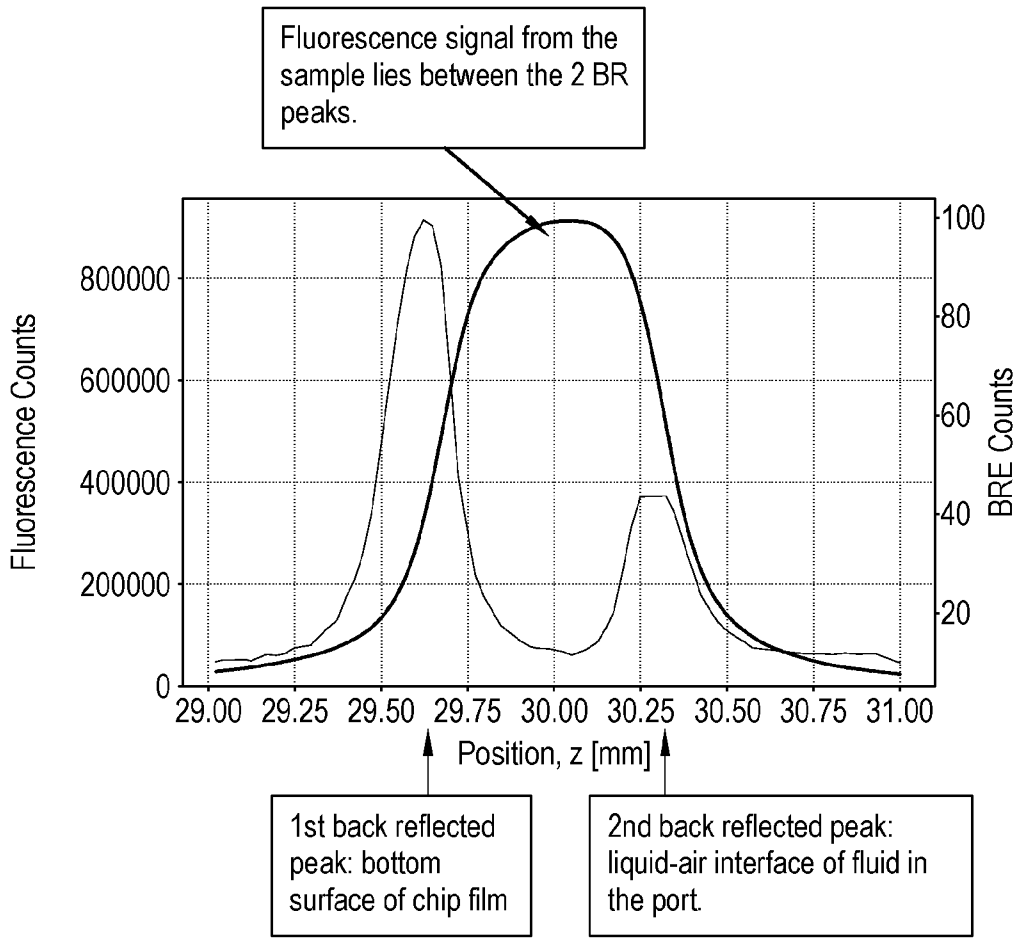

FIG. 12 provides a plot showing the greatest fluorescent power contribution; and FIG. 13 provides a plot showing the fluorescence signal and the back reflected excitation signal acquired over a range of focus/Z positions for a chip port.

The present invention as disclosed herein provides an apparatus and method for measuring at least one biophysical property of one or more components. A component may be referred to as a biomolecule. Examples of a component can be but is not limited to, a protein, a peptide, an exosome, an antibody or an antibody fragment thereof, a nucleotide such as DNA or DNA piece, RNA, siRNA or mRNA, or a polysaccharide.

As defined herein and unless otherwise specified, the term "biophysical property" is referred to the physical and/or chemical properties of a component that can be measured or detected using a biophysical technique such as fluorescence spectroscopy or micro diffusional sizing (MDS). Examples of one a biophysical property that can be measured may be, but is not limited to, the hydrodynamic radius, diffusivity, molecular weight, charge, isoelectric point, binding affinity, avidity, concentration, mass flux, concentration flux, and/or rate of diffusion of a component.

Figure 1:
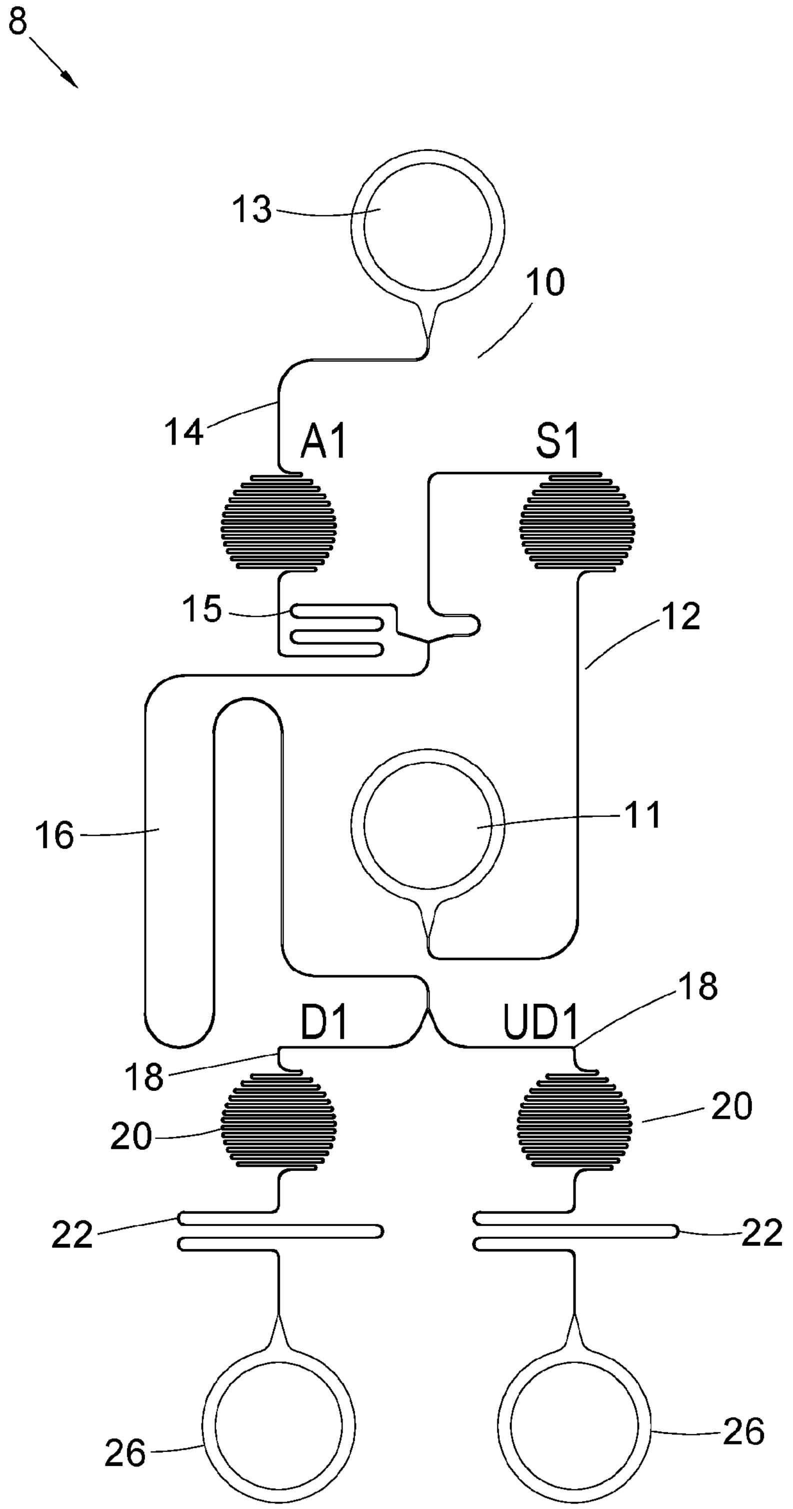

Referring to FIG. 1, there is provided a flow apparatus 8 for measuring at least one biophysical property of one or more components. The flow apparatus 8 comprises a device 10. The device 10 can be a microfluidic device. As shown in FIG. 1, a sample inlet port 11 is provided for loading the sample into the device 10. The device 10 comprises a sample channel 12 for introducing a sample fluid flow comprising one or more components at a first flow rate into an elongate distribution channel 16.

An auxiliary inlet port 13 is provided for loading an auxiliary fluid into an auxiliary channel 14. The auxiliary fluid can for example be a buffer solution or it may be water. The auxiliary channel 14 is provided for introducing an auxiliary fluid flow at a second flow rate into the elongate distribution channel 16. In addition, an upstream additional resistance channel 15 can be provided at the sample channel 12 and/or at the auxiliary channel 14 to help control the flow rate of the fluid flows. The auxiliary inlet port 13 can be also be used to take an initial reading of the auxiliary fluid.

The auxiliary inlet port 13 and the sample inlet port 11 have an open, i.e. un-lidded geometry. This reduces the locations available for the entrapment of bubbles. Furthermore, the distribution channel 16, sample 12 and auxiliary channels 14 are all provided with a coating. The coating itself is hydrophobic, but it is more hydrophilic than the untreated material from which the channels are formed. In providing the coating onto the channels, the inlet ports 11, 13 are also coated with a layer of the coating which makes the channels more hydrophilic than they would be in the absence of the coating. The coating is selected to aid the capillary filling of the device 10. Although the provision of the coating to the ports is merely an artefact of the coating procedure for the channels, providing the coating throughout avoids an interface between coated and non-coated surface as the fluids pass through the ports and into the channels.

The distribution channel 16 is configured to enable a lateral distribution of the components from the sample fluid flow into the auxiliary fluid flow after a steady state distribution is reached.

As illustrated in FIG. 1, a portion of the sample channel 12 and the auxiliary channel 14 is arranged in a serpentine or tortuous configuration 20. The tortuous configuration of the sample channel 12 and the auxiliary channel 14 may help reduce or eliminate air bubbles within the sample and/or auxiliary channels 12, 14.

Two or more capillary channels 18 are provided downstream and in fluid communication with the distribution channel 16 such that at least a part of the steady state fluid flow that has been reached moves into each of the capillary channels 18. A portion of each of the capillary channels 18 is arranged in a serpentine or tortuous configuration 20. The tightly compacted capillary channels increases sensitivity and reduces signal to noise ratio. In some instances, the serpentine or tortuous configuration 20 increases the flow area over which measurements can be taken to detect the component with a detector. This can be advantageous because it provides an increased volume of the capillary channel to be detected with a single detection spot and thus, this may enhance the sensitivity for detecting components of interest. Furthermore, the tortuous configuration 20 of the capillary channel 18 may also help reduce or eliminate air bubbles within the channel.

As illustrated in FIG. 1, the fluids within the distribution channel 16 are spilt into at least two capillary channels 18. Each of the capillary channels 18 may comprise a diffused and/or undiffused fluid flows. Each capillary channel 18 may further comprise a detection zone or region arranged in a serpentine configuration 20, where the diffused and/or undiffused sample fluid flows can be detected using a detector.

In addition, there is provided an additional resistance channel 22 to each capillary channel 18. The additional resistance channel 22 is configured to provide resistances on chip. "On-chip" resistances of the channels may be provided to control the flow of fluids through the channels. Upstream resistance can be the dominant factor in determining the flow balance within the distribution channel. Therefore, it may be possible to have only minimal resistance downstream. Minimising the on-chip resistance is important because the small geometries necessary for on-chip resistance are challenging to manufacture.

Each capillary channels 18 also comprise an outlet port 26 where detection of the sample fluid flow can be carried out, or additionally carried out in circumstances where a preliminary detection has taken place in the inlet port 11, 13. Detection of the component within the outlet port 26 can be advantageous as there is an increase in sensitivity due to the fact there is a larger quantity of the component available in the outlet port 26. In some instances, a background signal can be detected at the outlet port 26. Taking a background signal can be useful as it can enable the sample signal to be corrected, thereby improving the quality of the data obtained.

The outlet ports 26 are open and coated to make them more hydrophilic than the uncoated material. The coating material may be inherently hydrophobic, but the material from which the channels and ports are formed was more hydrophobic and therefore the effect of coating the channels is to increase their hydrophilicity. The outlet ports 26 have an open geometry and their proportions are selected to ensure that they stop capillary filling. The geometry of the ports 26 may also be selected so that evaporation from the ports 26 does not have a significant effect on the use of the apparatus 8.

The outlet ports 26 have a trumpet shaped entrance in which the capillary channel broadens gradually as it approaches the outlet port 26. The outlet port 26 comprises an annular ring and the fluid flows preferentially through the trumpet and around the annular ring. Without wishing to be limited by theory, this configuration appears to reduce or even eradicate concentration gradients within the outlet port 26. This, in turn, means that a detection reading of the outlet port 26 is a true representation of the whole contents of the port 26 rather than a mere snapshot across a gradient.

The annular ring has a height of 40 μm, which is equal to the height of the microfluidic channel which feeds into the outlet port 26. This ensures that there is no step which might otherwise provide a location for the collection of bubbles. The fluid flows along the channels, spreads out through the trumpet shaped opening and then flows around the annular ring forcing out an air that might otherwise be trapped. The fluid then proceeds to flow into the outlet port 26 as a whole displacing air evenly so that no bubbles are formed.

The ports can be manufactured by either drilling or they could be molded. Their functionality should be agnostic as to their manufacture methodology.

Referring to FIG. 1, a switchable pressure source (not shown in the accompanying drawings) can be provided and is configured to control the flow of the fluids through the fluid channels 12, 14, 16, 18. The pressure source can be a pump such as a syringe pump or a pressure pump. The pressure pump can be connectable to the sample fluid channel 12 and/or auxiliary fluid channel 14 to provide a positive pressure source for moving the fluid flows along the channels. Alternatively or additionally, a syringe pump can be connectable at the outlet ports 26 provided at the capillary channels 18 to move the fluid flows along the fluid channels.

A detector (not shown in the accompanying drawings) can be provided with the apparatus set up. The detector can be configured to detect and measure at least one biophysical property of the or each component sequentially or simultaneously in each of the capillary channels 18 on a microfluidic chip. Additionally or alternatively, the detector may be configured to detect and measure at least one biophysical property of the or each component sequentially or simultaneously in each of the outlet ports 26 on the microfluidic chip.

A second detector (not shown in the accompanying drawings) can be provided upstream of the distribution channel 16. The second detector can be configured to detect and measure at least one biophysical property of the or each component in the sample channel 12.

By providing a second detector upstream from the distribution channel, the background signal can be accounted for in order to provide accurate measurements. The background signal of the system is measured within the auxiliary channel and the background signal can be subtracted from the sample signal measurements in the capillary channels. The detected signal sample at the capillary channels can be corrected by subtracting the background signal.

The geometry of the microfluidic device can be a certain configuration such that the distribution channel length and width as well as the overall chip resistances are suitable for the size range of a typical biomolecule such as a protein with a hydrodynamic radius of between 1 to 20 nm. The pressure differences within the device can be achievable using a vacuum pump, in which a pressure difference of between −50 to −1000 mbar can be achieved. The distribution channel width has to be such that it is comparable to sqrt(Dt) with t the time spent in the distribution channel i.e. t=L/v, L the length of the diff channel and v the average fluid velocity given a chip resistance R and a pressure differential dp and D the diffusion coefficient of a typical protein.

By way of example only, the width of the distribution channel can be between 5-100 μm, or it can be more than 30, 32, 34, 36, 38, 40, 42, 44, 46 or 48 μm. In some instances, the width of the distribution channel can be less than 50, 48, 46, 44, 42, 40, 38, 36, 34 or 32 μm. For example, the width of the distribution channel is approximately 40 μm. The length of the distribution channel can be between 1-100 mm, or it can exceed 5, 10, 20, 25, 30, 35, 40 or 45 mm. In some instances, the length of the distribution channel may be less than 50, 45, 40, 35, 30, 25, 20, 15 or 10 mm. For example, the length of the distribution channel is approximately 23 mm. The total resistance of the microfluidic device can be between 20-2000 mbar/μl/min, or it may exceed 100, 150, 200, 250, 300, 350, 400 or 450 mbar/μl/min. In some instances, the total resistance of the microfluidic device may be less than 500, 450, 400, 350, 300, 250, 200 or 150 mbar/μl/min. For example, the total resistance of the microfluidic device is approximately 250 mbar/μl/min.

The microfluidic device may be provided in a dark color such as black to reduce background light and fluorescence. The microfluidic devices, which can be plastic, can be manufactured by injection moulding technique. The microfluidic device can be made black with colourants and/or additives, for instance Carbon black.

The method for measuring at least one biophysical property of one or more components as disclosed in the present invention can be performed on the flow apparatus as illustrated in FIG. 1. The method comprising the steps of introducing a sample fluid flow comprising one or more components into an elongate distribution channel at a first flow rate in the region of 0.01 to 10 μl/min; introducing an auxiliary fluid flow into the distribution channel at a second flow rate, providing, in the distribution channel, a lateral distribution of the component(s) from the sample fluid flow into the auxiliary fluid flow until a steady state distribution is reached; separating at least a part of the steady state fluid flow into two or more capillary channels downstream of the distribution channel; stopping the flow of the fluids at a pre-determined time after the steady state distribution has been reached; and measuring at least one biophysical property of the or each component sequentially or simultaneously in each of the capillary channels on a microfluidic chip.

The sample and auxiliary fluid flows are loaded into either side of an H-filter that may include on-chip resistances. A pressure source (vacuum or positive) can be provided to induce pressure-driven flow of the sample and auxiliary fluids into the chip. The resistance of the sample and capillary channels help to control the sample flow. Once diffusive equilibrium has reached in both the distribution channel and downstream capillary channels, it is possible to stop the flow and perform optical detection.

A stopping means can be used to stop the flow of the fluids. The stopping means can be provided to stop the flow of fluids whilst maintaining the equilibrated state. By way of example only, a releasable valve can be provided on the device to stop the fluid flows. A pressure release valve is provided to equilibrate pressure across the chip. Examples of a releasable valve can be a pressure release valve. A pressure release valve can be provided to equilibrate pressure across the flow device. For example, the pressure release valve may be provided to equilibrate the sample channel, auxiliary channel, distribution channel and/or the downstream capillary channels. To ensure that a steady state distribution of components can be reached, a user can set a pre-determined time to enable the steady state distribution of one or more components to be reached before stopping the fluid flows.

The detection of the sample flow can be performed at a location beyond the end of the distribution channel such as in the capillary channels. The detector can be an optical detector. The detector can be a high resolution camera or a photomultiplier tube.

An additional mode of operation can be implemented to perform multiple start-stop analyses to perform time-course experiments. A further mode of operation can be to perform a processing step such as an incubation step when the flows are stopped and before subsequent analysis.

Figure 2:
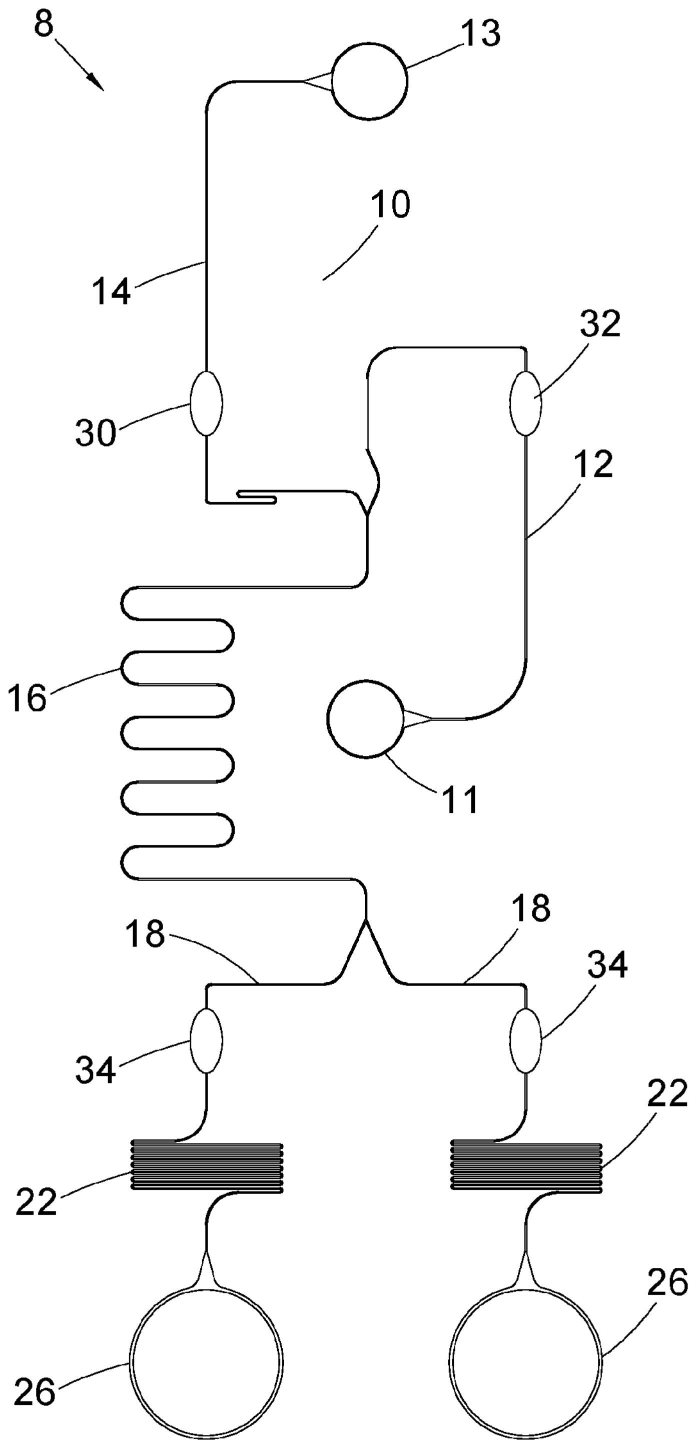

Referring to FIG. 2, there is provided an embodiment of the apparatus 8 set up according to the present invention. The apparatus 8 comprises a device 10 such as a microfluidic device. As shown in FIG. 2, a sample port 11 is provided for loading the sample into the device 10. The device 10 comprises a sample channel 12 for introducing a sample fluid flow comprising one or more components at a first flow rate into an elongate distribution channel 16.

An auxiliary inlet port 13 is provided for loading an auxiliary fluid flow into an auxiliary channel 14. The auxiliary channel 14 is configured to introduce the auxiliary fluid flow at a second flow rate into the elongate distribution channel 16. The distribution channel 16 is configured to enable a lateral distribution of the components from the sample fluid flow into the auxiliary fluid flow after a steady state distribution is reached.

Two or more capillary channels 18 is provided downstream and in fluid communication with the distribution channel 16 such that at least a part of the steady state fluid flow that has been reached moves into each of the capillary channels 18. A portion of each of the capillary channels 18 may be arranged in a serpentine or tortuous configuration 20.

As illustrated in FIG. 2, one or more upstream detection chamber 30, 32 is provided upstream of the distribution channel 16. The upstream detection chamber or chambers can be used to provide an initial reading of the sample before it meets the auxiliary fluid and also of the auxiliary fluid before it meets the sample. This helps to calibrate the detection system as the reading for the auxiliary fluid, which may be plain water, should be known. For example, an upstream sample detection chamber 30 is provided on the sample channel 12 and an upstream auxiliary detection chamber 32 is provided on the auxiliary channel 14.

As illustrated in FIG. 2, one or more detection chambers 34 can be provided downstream of the distribution channel 16 and in fluid communication with the capillary channels 18. A detector can be provided to detect at least a part of the steady state fluid flow in each of the downstream detection chambers 34. At least one biophysical property of one or more components can be measured sequentially or simultaneously in each of the downstream detection chamber 34 on the microfluidic chip.

In addition, there is provided an additional resistance channel 22 to each capillary channel 18. The additional resistance channel 22 is configured to provide resistances on chip.

The capillary channels 18 also comprise an outlet port 26 where detection of the sample fluid flow can be carried out. Detection and analysis of the component within the outlet port 26 using a detector can be advantageous as there is an increase in sensitivity due to the fact there is a larger quantity of the component available in the outlet port 26. The fluid flow collated within the outlet port 26 can then be collected for further analysis or discarded by a user.

Figure 3:
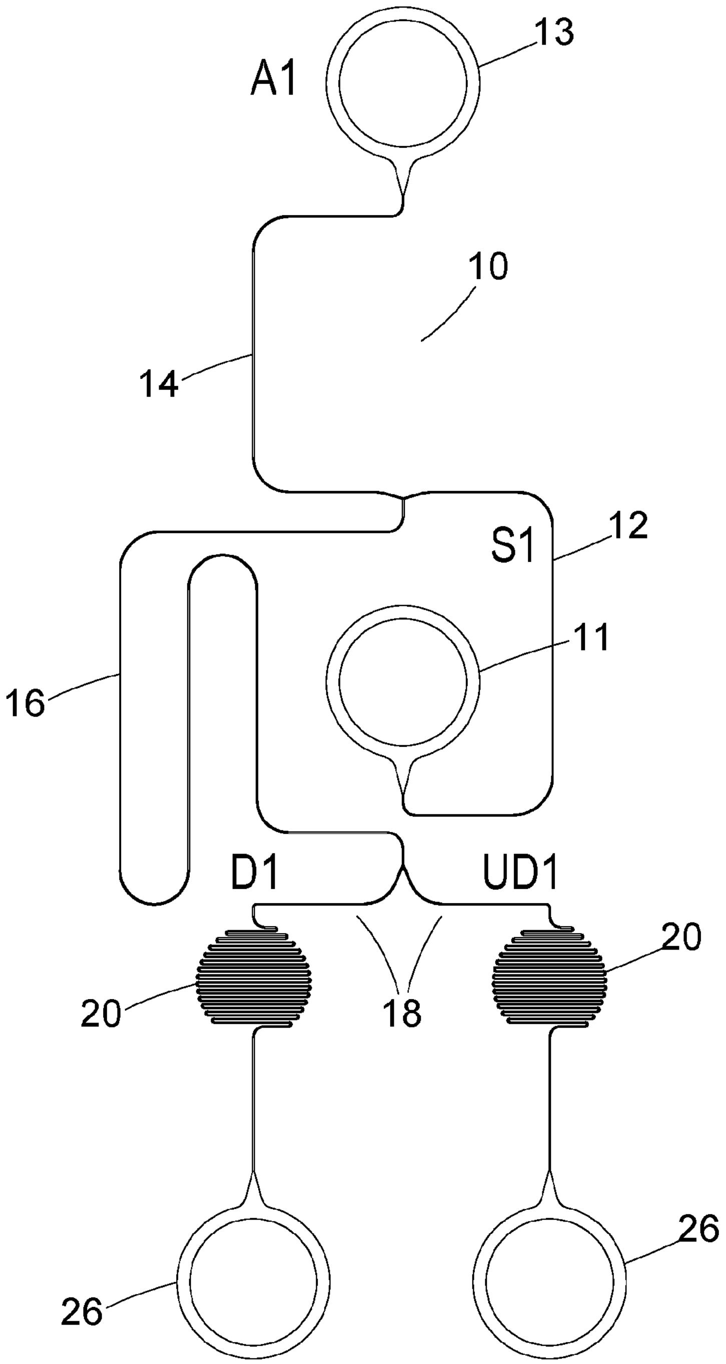
FIG. 3 shows an alternative embodiment the flow device for measuring at least one biophysical property of one or more components according to FIG. 1.

Referring to FIG. 3, there is provided an alternative embodiment of the device 10 according to the present invention as disclosed herein. As shown in FIG. 3, a sample port 11 is provided for loading the sample into the device 10. The device 10 comprises a sample channel 12 for introducing a sample fluid flow comprising one or more components at a first flow rate into an elongate distribution channel 16. An auxiliary inlet port 13 is provided for loading an auxiliary fluid flow into an auxiliary channel 14. The auxiliary channel 14 is configured to introduce the auxiliary fluid flow at a second flow rate into the elongate distribution channel 16. The distribution channel 16 is configured to enable a lateral distribution of the components from the sample fluid flow into the auxiliary fluid flow after a steady state distribution is reached.

Two or more capillary channels 18 are provided downstream and in fluid communication with the distribution channel 16 such that at least a part of the steady state fluid flow that has been reached moves into each of the capillary channels 18. A portion of each of the capillary channels 18 is arranged in a serpentine or tortuous configuration 20.

An outlet port 26 is provided downstream and in fluid communication with the capillary channel 18. Detection and analysis of the component using a detector can be carried out within the outlet port 26.

Figure 4:
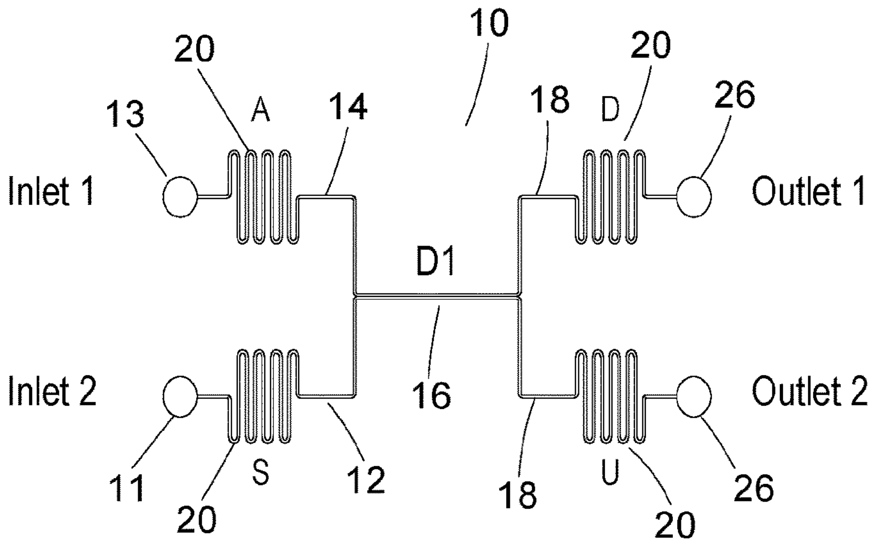
FIG. 4 shows the flow device with an H-filter configuration according to the present invention.

Referring to FIG. 4, there is provided a sample port 11 for loading the sample into the device 10. Furthermore, there is provided a device 10 comprising a sample channel 12 for introducing a sample fluid flow comprising one or more components at a first flow rate into an elongate distribution channel 16. An auxiliary inlet port 13 is provided for loading an auxiliary fluid flow. An auxiliary channel 14 is provided for introducing an auxiliary fluid flow at a second flow rate into the elongate distribution channel 16. The sample and auxiliary fluid flows are loaded into the sample channel 12 and auxiliary channel 14 respectively using vacuum or positive pressure.

The distribution channel 16 is configured to enable a lateral distribution of the components from the sample fluid flow into the auxiliary fluid flow after a steady state distribution is reached. A portion of the sample channel 12 and a portion of the auxiliary channel 14 are arranged in a serpentine or tortuous configuration 20.

Two or more capillary channels 18 is provided downstream and in fluid communication with the distribution channel 16 such that at least a part of the steady state fluid flow that has been reached moves into each of the capillary channels 18. A portion of each of the capillary channels 18 is arranged in a serpentine or tortuous configuration 20. An outlet port 26 is provided downstream and is in fluid communication with the capillary channel 18.

As illustrated in FIG. 4, detection of the component can be performed in the capillary channels 18 and more specifically, within the tortuous region 20 of the capillary channel 18.

Using the device as illustrated in FIG. 4, a user can take accurate measurements of the component by accounting for a background signal. Sources of background signal can include, but is not limited to fluorescence, absorption, reflections and scattering from the auxiliary fluid, chip materials and wider opto-mechanical system.

The background signal of the device 10 as shown in FIG. 4 can be measured at the auxiliary channel 14 using a detector. In particular, the background measurement can be taken at the tortuous region 14 of the auxiliary channel 14. This background signal can then be subtracted from the measurements taken at the downstream capillary channels 18 to derive a background corrected measurement.

To account for a background signal and sample adhesion, the following steps are required. The background signal of the system is measured at the sample channel 12 and in particular at the tortuous region 20 of the sample channel 12. This background signal can then be subtracted from the measurements taken at the downstream capillary channels 18 to derive a background corrected measurement of distributions ratio. The signal measured at the tortuous region 20 of the sample channel 12 is measured and compared to the sum of the measurements taken downstream at the tortuous region 20 of the capillary channels 18 in order to check for sample adhesion. By accounting for the background signal, the user is able to correct concentration measurement of the sample.

Figure 5A:
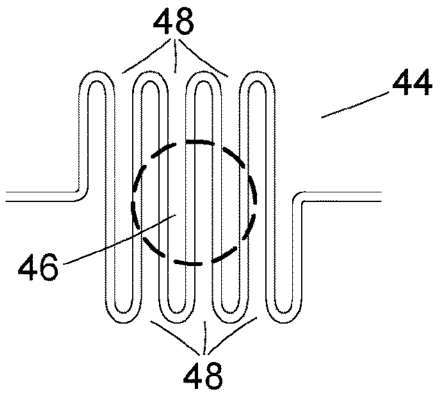
FIG. 5A shows an embodiment of a fluid channel such as a capillary channel.
Figure 5B:
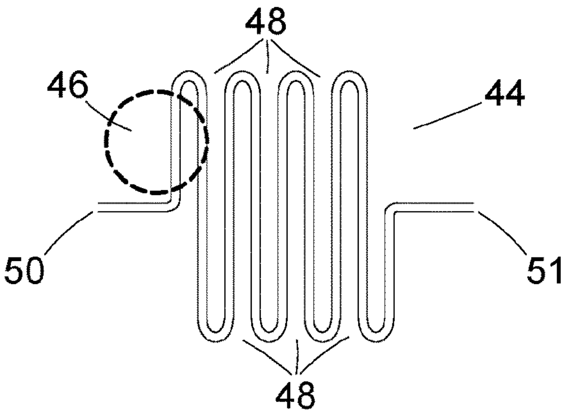
FIG. 5B shows an embodiment of a fluid channel according to FIG. 5A.
Figure 5C:
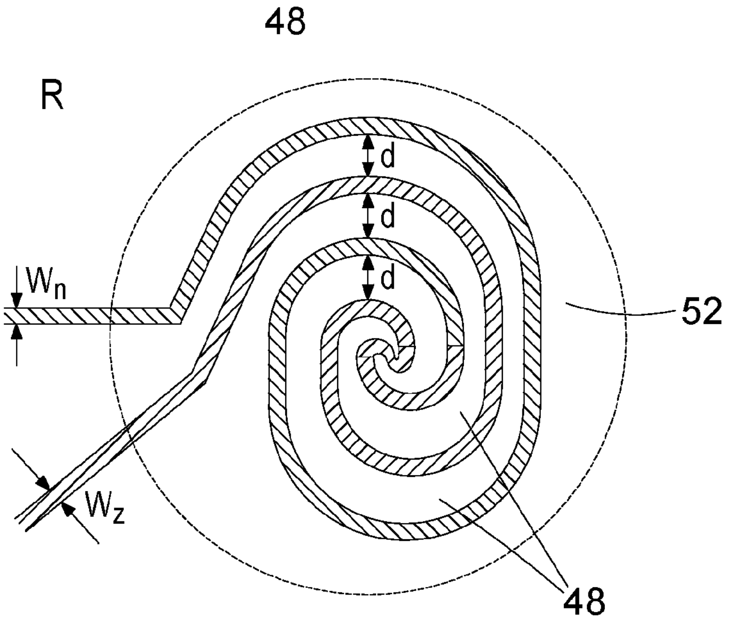
FIG. 5C shows an alternative embodiment of the fluid channel such as a capillary channel.

Referring to FIGS. 5A to 5C, there is provided an illustration of a detection region 44 of a fluid channel. The fluid channel may be a sample channel, an auxiliary channel and/or a capillary channel. The detection region 44, which may be an optical detection region, can be created by closely spaced segments 48 of a microfluidic channel. The detection region may be in a form of a tortuous configuration 44, as shown in FIGS. 5A and 5B. The geometry as shown in FIG. 5A can significantly reduce risk of bubble entrapment within the fluid channels. This geometry significantly improves the accuracy of measurements of the components within the fluid flows. A portion of a channel that comprises a tortuous configuration may form part of the flow resistance network on the chip.

As a fluid flow comprising one or more components enter the detection region 44, the fluid flow can be stopped within the detection region 44 via by a pressure release valve provided on the chip. A detector (not shown in the accompanying drawings) may be provided to detect one or more components within the tortuous region 44 of the fluid channel, as indicated in FIGS. 5A and 5B, a detection area 46 of the tortuous region 44 can be selected. Preferably, the detector is an optical detector.

The spacing between each segment or region 48 of the tortuous portion 44 of the fluid channel may be close together. In some embodiments, the spacing between the segments or regions 48 of the tortuous part 44 of the channel may be constant or it may vary along the entire tortuous region 44 of the channel. In some embodiments, the tortuous portion comprises a serpentine configuration.

The spacing between each segment 48 of the tortuous portion 44 is approximately 10 to 50 μm apart or it may be 10 to 30 μm apart. In some examples, the spacing between each segment 48 can be more than 10, 15, 20, 25, 30, 35, 40 or 45 μm apart. In some examples, the spacing between each segment may be less than 50, 45, 40, 35, 30, 25, 20 or 15 μm. Optionally, the spacing between each segment is approximately 30 μm.

Closer spacing between the segments or region 48 can increase optical accuracy and sensitivity by minimising the amount of background signal cause by the chip material and maximising the detection volume available for a given optical detection area 46. To avoid the necessity for highly precise positioning of the chip relative to the optical system, the optical illumination or detection is kept well inside detection region, as indicated by the detection area 46 in FIG. 5A.

Referring to FIG. 5B, there is provided an illustration of an alternative embodiment of a detection region 44 of a fluid channel such as a capillary channel, where FIG. 5B shows that it is possible to move the detection area 46 closer to an inlet end 50 of the detection region 44. Sample adhesion can occur along the channel and therefore there will be more sample adhesion at the outlet end 51 of the detection region 44 than there is at the inlet end 50 of the detection region 44. Thus, providing a detection area 46 near the inlet end 50 of the detection region 44 can maximise the detection of sample that has not been affected by protein adhesion.

Furthermore, a portion of the fluid channel, which may be a capillary channel, sample channel or auxiliary channel may comprise a helical configuration 52 as illustrated in FIG. 5C. The spacing between each segment 48 of the helical configuration 52 can be 10 to 50 μm apart, or it can be more than 10, 15, 20, 25, 30, 35, 40 or 45 μm apart. In some examples, the spacing between each segment 48 of the helical configuration 52 may be less than 50, 45, 40, 35, 30, 25, 20 or 15 μm.

Optionally, the spacing between each segment 48 of the helical configuration 52 is approximately 30 μm. It will be appreciated by the skilled person that any shape or configuration of the tortuous region can be provided in order to increase optical accuracy and sensitivity.

The present invention as disclosed herein provides a microfluidic chip comprising a plurality of microfluidic circuits. The invention also relates to a method for capillary filing the microfluidic chip. As disclosed herein and unless otherwise specified, a component may be referred to as a biomolecule. Examples of a component can be but is not limited to, a protein, a peptide, an exosome, an antibody or an antibody fragment, a nucleotide such as DNA or DNA piece, RNA, siRNA or mRNA, or a polysaccharide.

As defined herein and unless otherwise specified, the term "biophysical property" is referred to the physical and/or chemical properties of a component that can be measured or detected using a biophysical technique such as fluorescence spectroscopy or micro diffusional sizing (MDS). Examples of one a biophysical property that can be measured may be, but is not limited to, hydrodynamic radius, diffusivity, molecular weight, charge, isoelectric point, binding affinity, avidity, concentration, mass flux, concentration flux, and/or rate of diffusion of a component.

Figure 6:
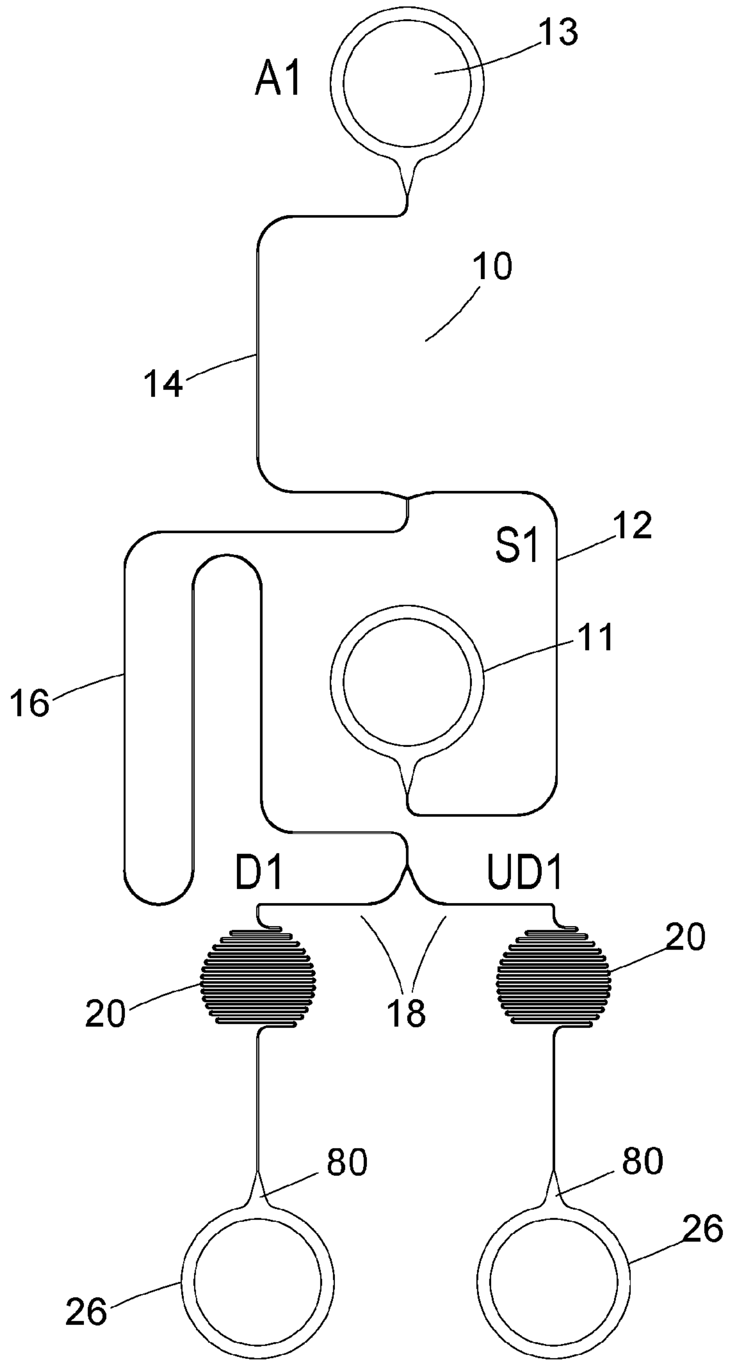
FIG. 6 shows a microfluidic circuit according to the present invention.

Referring to FIG. 6, there is provided a chip 8. The chip 8 comprises a plurality of parallel microfluidic circuits 10. The microfluidic circuit or microfluidic device 10 can be capillary filled with one or more fluid flows such as a sample fluid flow and/or an auxiliary fluid flow. Each microfluidic circuit or device 10 comprises a system fluid inlet or auxiliary inlet channel commencing with a system fluid inlet port 13 through which system fluid can be introduced into the circuit 10. Each microfluidic circuit or device 10 may also comprise a sample fluid inlet channel 12 commencing with a sample fluid inlet port 11 through which sample fluid can be introduced into the circuit or device 10.

Each inlet port 11, 13 comprise a flow guide that extends around at least part of the perimeter of the inlet port 11, 13. The circuit 10 may further comprise an expansion feature 80 between each inlet channel 12, 14 and the corresponding inlet port 11, 13 whereby the expansion feature 80 comprises a tapered section adjacent the channel and a curved section adjacent to the port.

The expansion feature 80 as shown in FIG. 6 may be provided between each channel and the corresponding port which can help in formation of protruding liquid-air interface at the port-channel junction for wetting liquid. The expansion feature has a tapered form expanding from the channel towards the port. This enables the port to fill under capillary forces as the fluid would otherwise stop on reaching a large step in diameter as presented between the channel and the port. This effect is further assisted by the provision of an annulus "flow guide" which further acts to draw the fluid into the port by providing an initial flow pathway for the fluid around the perimeter of the port. If the port has a circular cross section, then the flow guide may be an annulus. The dimensions of the annulus can be chosen to conform closely to the channel dimensions. The flow guide may not be provided around the entire perimeter of the port, but instead it may be provided only in the region of the port that is adjacent to the channel entry point.

A distribution channel 16 is provided and is in fluid communication with both the system fluid or auxiliary channel 14 and the sample fluid channel 12. The distribution channel 16 is also in fluid communication with two capillary or outlet channels 18 terminating in outlet ports 26. The sample inlet channel 12, the system or auxiliary fluid inlet channel 14 together with the distribution channel 16 and the capillary or outlet channels 18 can form an H-filter configuration.

Each of the channels 12, 14, 16, 18 may have a maximum width or height no greater than 100 μm or 90, 80, 70, 60 or 50 μm. In some instances, each of the channels may have a maximum width or height no greater than 5, 10, 15, 20, 25, 30, 35, 40, 45 or 50 μm. In addition, the microfluidic circuit as disclosed herein further comprising connectivity for a vacuum source at each of the outlet ports 26.

Referring to FIG. 6, there is provided a chip or flow apparatus 8 for capillary filling the microfluidic circuit or device with one or more fluid flows such as a sample fluid flow and/or an auxiliary fluid flow. The flow apparatus 8 comprises a device 10. As shown in FIG. 6, a sample inlet port 11 is provided for loading the sample into the device 10. The device 10 comprises a sample channel 12 for introducing a sample fluid flow comprising one or more components at a first flow rate into an elongate distribution channel 16.

An inlet port 13 is provided on the system fluid inlet channel 14 for loading an auxiliary fluid into the system fluid inlet channel 14. The system fluid or auxiliary fluid can for example be a buffer solution or it may be water. The auxiliary channel 14 is provided for introducing an auxiliary fluid flow at a second flow rate into the elongate distribution channel 16. In addition, an upstream additional resistance channel may be provided at the sample channel 12 and/or at the auxiliary channel 14 to help control the flow rate of the fluid flows. The auxiliary inlet port 13 can be also be used to take an initial reading of the auxiliary fluid.

The auxiliary or system inlet port 13 and the sample inlet port 11 have an open, i.e. un-lidded geometry. This reduces the locations available for the entrapment of bubbles. Furthermore, the distribution channel 16, sample 12 and auxiliary channels 14 are all provided with a coating. The coating itself is hydrophobic, but it is more hydrophilic than the untreated material from which the channels are formed. In providing the coating onto the channels, the inlet ports 11, 13 are also coated with a monomeric layer of the coating which makes the channels more hydrophilic than they would be in the absence of the coating. The coating is selected to aid the capillary filling of the device 10. Although the provision of the coating to the ports is merely an artefact of the coating procedure for the channels, providing the coating throughout avoids an interface between coated and non-coated surface as the fluids pass through the ports and into the channels.

The distribution channel 16 is configured to enable a lateral distribution of the components from the sample fluid flow into the auxiliary fluid flow after a steady state distribution is reached.

A portion of the sample fluid inlet channel 12 and the system fluid inlet channel 14 may be arranged in a serpentine or tortuous configuration 20. The tortuous configuration of the sample channel 12 and the auxiliary channel 14 may help reduce or eliminate air bubbles within the sample and/or auxiliary channels 12, 14.

As illustrated in FIG. 6, two or more capillary channels 18 are provided downstream and in fluid communication with the distribution channel 16 such that at least a part of the steady state fluid flow that has been reached moves into each of the capillary channels 18. A portion of each of the capillary channels 18 is arranged in a serpentine or tortuous configuration 20. The tightly compacted capillary channels increases sensitivity and reduces signal to noise ratio. In some instances, the serpentine or tortuous configuration 20 increases the flow area over which measurements can be taken to detect the component with a detector. This can be advantageous because it provides an increased volume of the capillary channel to be detected with a single detection spot and thus, this may enhance the sensitivity for detecting components of interest. Furthermore, the tortuous configuration 20 of the capillary channel 18 may also help reduce or eliminate air bubbles within the channel.

As illustrated in FIG. 6, the fluids within the distribution channel 16 are spilt into at least two capillary channels 18. Each of the capillary channels 18 may comprise a diffused and/or un-diffused fluid flows. Each capillary channel 18 may further comprise a detection zone or region arranged in a serpentine configuration 20, where the diffused and/or un-diffused sample fluid flows can be detected using a detector.

In addition, there may be provided an additional resistance channel to each capillary channel 18. Additionally or alternatively, an additional resistance channel may be provided to each sample fluid channel and/or to each system fluid or auxiliary inlet channel. The additional resistance channel can be configured to provide resistances on chip. "On-chip" resistances of the channels may be provided to control the flow of fluids through the channels. Upstream resistance can be the dominant factor in determining the flow balance within the distribution channel. Therefore, it may be possible to have only minimal resistance downstream. Minimising the on-chip resistance is important because the small geometries necessary for on-chip resistance are challenging to manufacture. Alternatively, or additionally, the downstream resistance may exceed the upstream resistance.

Each capillary channels 18 also comprise an outlet port 26 where detection of the sample fluid flow can be carried out, or additionally carried out in circumstances where a preliminary detection has taken place in the inlet port 11, 13. Detection of the component within the outlet port 26 can be advantageous as there is an increase in sensitivity due to the fact there is a larger quantity of the component available in the outlet port 26. In some instances, a background signal can be detected at the outlet port 26. Taking a background signal can be useful as it can enable the sample signal to be corrected, thereby improving the quality of the data obtained.

At least one outlet port 26 is provided downstream and in fluid communication with the capillary channel 18. Detection and analysis of the component using a detector can be carried out within the outlet port 26.

The outlet ports 26 are open and coated to make them more hydrophilic than the uncoated material. The coating material may be inherently hydrophobic, but the material from which the channels and ports are formed was more hydrophobic and therefore the effect of coating the channels is to increase their hydrophilicity. The outlet ports 26 have an open geometry and their proportions are selected to ensure that they stop capillary filling. The geometry of the ports 26 may also be selected so that evaporation from the ports 26 does not have a significant effect on the use of the chip 8.

The outlet ports 26 have an expansion feature 80 which is a trumpet shaped section in which the capillary channel 18 broadens gradually as it approaches the outlet port 26. The broadening occurs in two parts: the first is a straight sided taper out from the channel and the second part is a curved section that increases the cross section further as the channel reaches the port. The curved section is formed as the arc of a circle of radius 0.2 mm, although the radius of the circle may be between 0.05 mm and 0.4 mm. The outlet port 26 comprises an annular ring and the fluid flows preferentially through the trumpet and around the annular ring. Without wishing to be limited by theory, the combination of the curved section of the trumpet shaped entrance and the annular ring appears to reduce or even eradicate concentration gradients within the outlet port 26.

This, in turn, means that a detection reading of the outlet port 26 is a true representation of the whole contents of the port 26 rather than a mere snapshot across a gradient.

The annular ring has a height of 40 μm, which is equal to the height of the microfluidic channel which feeds into the outlet port 26. This ensures that there is no step which might otherwise provide a location for the collection of bubbles. The fluid flows along the channels, spreads out through the trumpet shaped opening and then flows around the annular ring forcing out an air that might otherwise be trapped. The fluid then proceeds to flow into the outlet port 26 as a whole displacing air evenly so that no bubbles are formed.

The ports can be manufactured by either drilling or they could be molded. Their functionality should be agnostic as to their manufacture methodology.

Moreover, the ports may be hydrophilic. With hydrophilic modification of the port, aqueous reagents introduced into the port would seamlessly merge with protruding interface of wetting liquid. This eliminates introduction of bubbles on chip operation. The roughness of the bottom of the loading port could be enhanced/engineered to spread or wick the loaded reagent uniformly into the port.

Referring to FIG. 6, a switchable pressure source (not shown in the accompanying drawings) can be provided and is configured to control the flow of the fluids through the fluid channels 12, 14, 16, 18. The pressure source can be a pump such as a syringe pump or a pressure pump. The pressure pump can be connectable to the sample fluid channel 12 and/or auxiliary fluid channel 14 to provide a positive pressure source for moving the fluid flows along the channels. Alternatively or additionally, a syringe pump can be connectable at the outlet ports 26 provided at the capillary channels 18 to move the fluid flows along the fluid channels.

A detector (not shown in the accompanying drawings) can be provided with the apparatus set up. The detector can be configured to detect and measure at least one biophysical property of the or each component sequentially or simultaneously in each of the capillary channels 18 on a microfluidic chip. Additionally or alternatively, the detector may be configured to detect and measure at least one biophysical property of the or each component sequentially or simultaneously in each of the outlet ports 26 on the microfluidic chip.

A second detector (not shown in the accompanying drawings) can be provided upstream of the distribution channel 16. The second detector can be configured to detect and measure at least one biophysical property of the or each component in the sample channel 12.

By providing a second detector upstream from the distribution channel, the background signal can be accounted for in order to provide accurate measurements. The background signal of the system is measured within the auxiliary channel and the background signal can be subtracted from the sample signal measurements in the capillary channels. The detected signal sample at the capillary channels can be corrected by subtracting the background signal.

The background signal of the device 10 as shown in FIG. 6 can be measured at the auxiliary channel 14 using a detector. This background signal can then be subtracted from the measurements taken at the downstream capillary channels 18 to derive a background corrected measurement.

To account for a background signal and sample adhesion, such as protein adhesion, the following steps are required. The background signal of the system is measured at the sample channel 12 and in particular at the tortuous region 20 of the sample channel 12. This background signal can then be subtracted from the measurements taken at the downstream capillary channels 18 to derive a background corrected measurement of distributions ratio. The signal measured at the tortuous region 20 of the sample channel 12 is measured and compared to the sum of the measurements taken downstream at the tortuous region 20 of the capillary channels 18 in order to check for sample adhesion. By accounting for the background signal, the user is able to correct concentration measurement of the sample.

Figure 7:
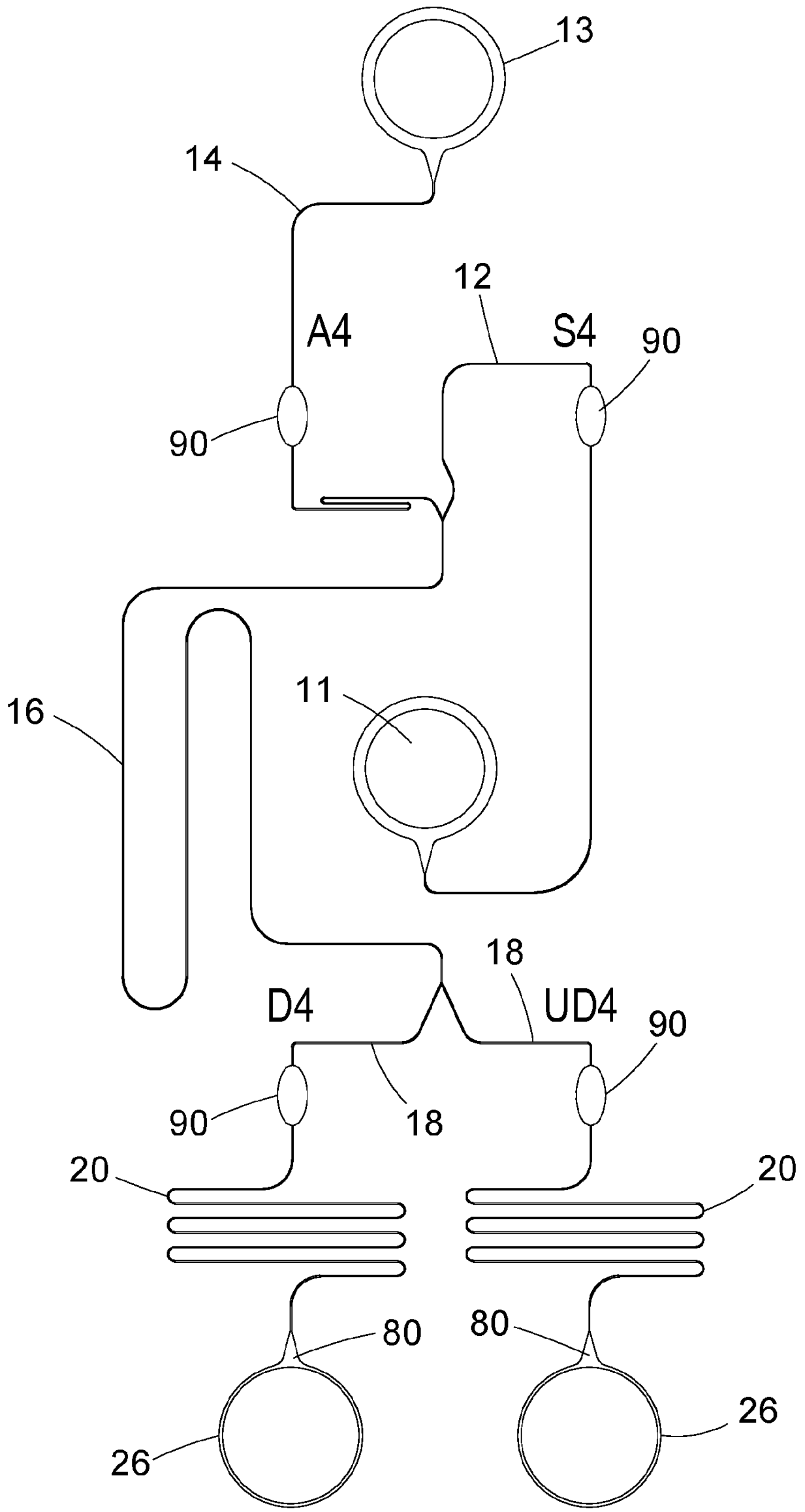
FIG. 7 shows an alternative embodiment of the microfluidic circuit according to FIG. 6.

As shown in FIG. 7, there is provided an alternative embodiment of a microfluidic circuit or microfluidic device 10 which can be capillary filled with one or more fluid flows. Each microfluidic circuit or device 10 comprises a system fluid inlet or auxiliary inlet channel commencing with a system fluid inlet port 13 through which system fluid can be introduced into the circuit 10. Each microfluidic circuit or device 10 may also comprise a sample fluid inlet channel 12 commencing with a sample fluid inlet port 11 through which sample fluid can be introduced into the circuit or device 10.

Each inlet port 11, 13 comprises a flow guide that extends around at least part of the perimeter of the inlet port 11, 13. The circuit 10 may further comprise an expansion feature 80 between each inlet channel 12, 14 and the corresponding inlet port 11, 13 whereby the expansion feature 80 comprises a tapered section adjacent the channel and a curved section adjacent to the port.

A distribution channel 16 is provided and is in fluid communication with both the system fluid or auxiliary channel 14 and the sample fluid channel 12. The distribution channel 16 is also in fluid communication with two capillary or outlet channels 18 terminating in outlet ports 26. The sample inlet channel 12 and system or auxiliary fluid inlet channel 14 with the distribution channel 16 together with the capillary or outlet channels 18 form an H-filter configuration.

A part of a fluid channel 12, 14, 18 within the microfluidic circuit comprise a delay region 90, which can be used to delay capillary filling of one or more channels with one or more fluid flows. For example, the sample inlet channel 12, the system inlet channel 14 and/or the capillary channel 18 may comprise the delay region 90. The delay region 90 can be used to guide capillary filling into preferred channels on the microfluidic circuit. This allows for contamination free reference measurements, even upon introduction of reagents. Delay regions 90 within the capillary channels 18 could also be used as containment regions for reagents, when they are introduced before completion of autonomous filling of the microfluidic circuit. The continued capillary filling would keep drawing reagents from various channels, but delay or containment regions 90 still prevent any reagents from passing into reference measurement locations on the microfluidic circuit.

Figure 8:
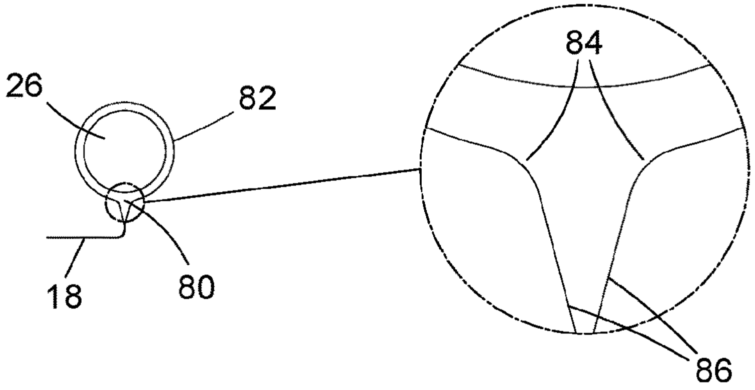
FIG. 8 shows a port with an expansion feature and a flow guide according to the present invention.

Referring to FIG. 8, there is shown a port 26 comprising a flow guide 82 that extends around at least part of the perimeter of the port 26. Additionally or alternatively, the port can be an inlet port. As illustrated in FIG. 8, the port 26 further comprises an expansion feature 80 between the channel, which in this case is the capillary channel 18 as shown in FIG. 8, and the corresponding port 26. The expansion feature 80 comprises a tapered section 86 adjacent to the channel 18 and a curved section 84 adjacent to the port 26.

Referring to FIGS. 9A to 9E, there is provided an example of an instrument 92 including a user interface 98 configured to communicate the measurements of one or more biophysical property of one or more components in a fluid in each of a plurality of microfluidic chips 96 present on a chip plate 94.

The chip plate 94 including the plurality of microfluidic chips 96 is configured to be inserted into the instrument 92 which operates to detect which microfluidic chips 96 have been used on the chip plate 94. The user interface, in particular, a display panel 98 located on the instrument 92 can then display this information to a user. The display provides information about each microfluidic chip 96. The information can be a binary indication as to whether or not each microfluidic chip 96 has been used and therefore whether or not it is available for the next experiment. In some instances, the display can also show an image of the plate 94 in use during experimentation.

Figure 9A:
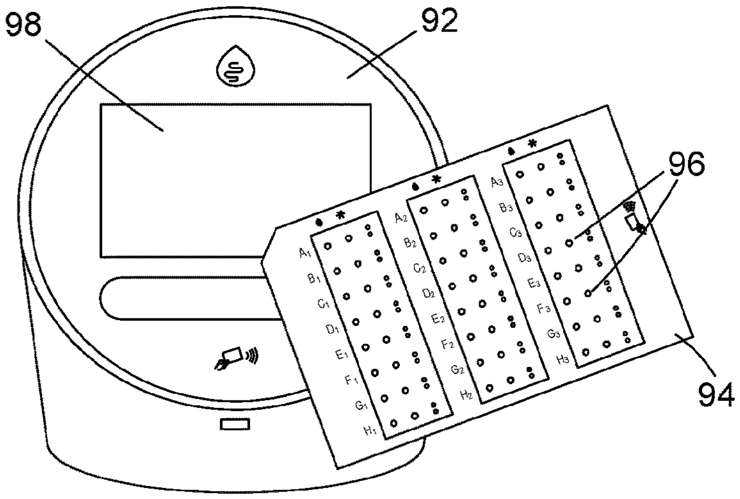
FIGS. 9A to 9E show a user interface according to the present invention.
Figure 9B:
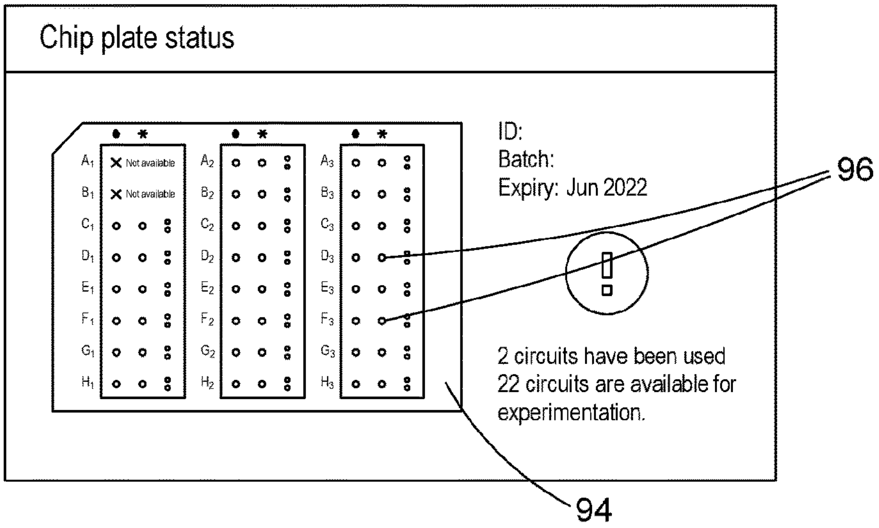
Figure 9C:
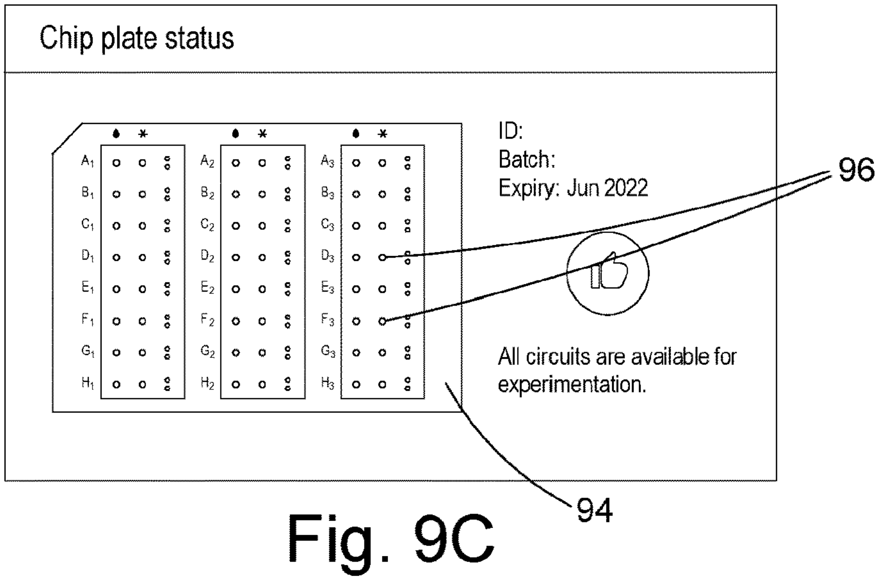
Figure 9D:
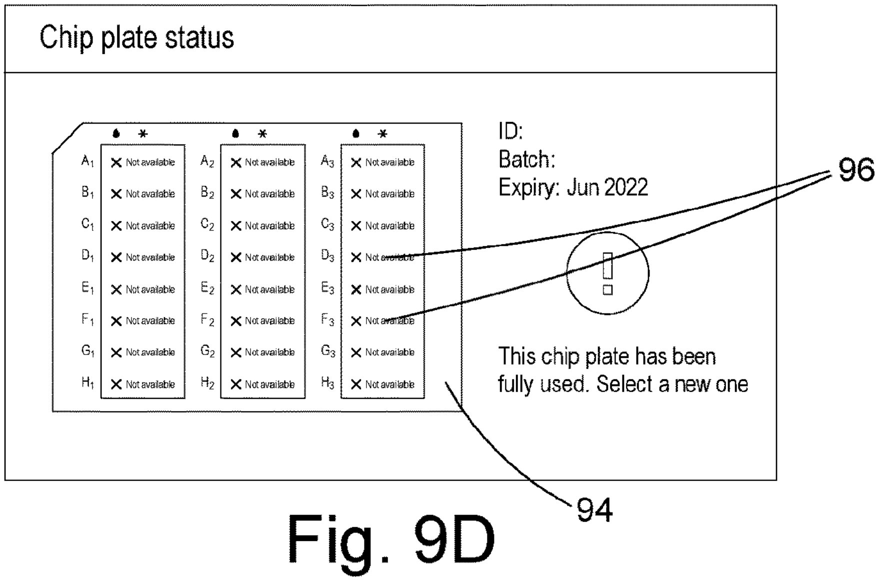
Figure 9E:
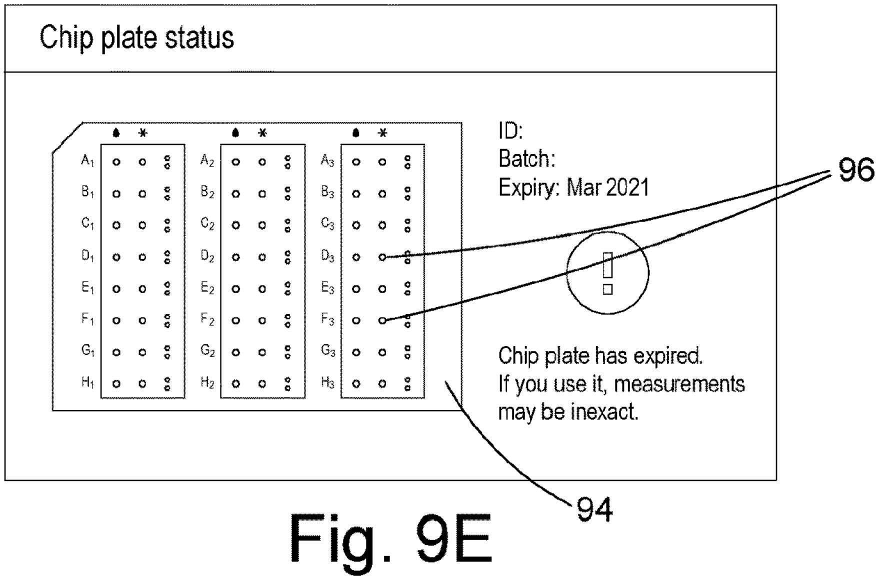

The instrument 92 may also contain a reader module (not shown in the accompanying drawings) configured to detect and read a unique authentication indicium, such as a barcode, positioned on the chip plate 94. Other forms of unique authentication code can be used on the chip plate: for example, a unique sets of numbers, batch codes, QR codes or a combination of letters and numbers that are unique to each chip plate 94. Alternatively the authentication indicium may be stored on an NFC or RFID tag. If the chip plate 94 has passed its expiry date, the instrument 92 can display this information to the user, as shown in FIG. 9E.

EXAMPLES

The examples below are applicable to one or more aspects and embodiments of the present invention as disclosed herein.

Active Position-Finding

Figure 10A:
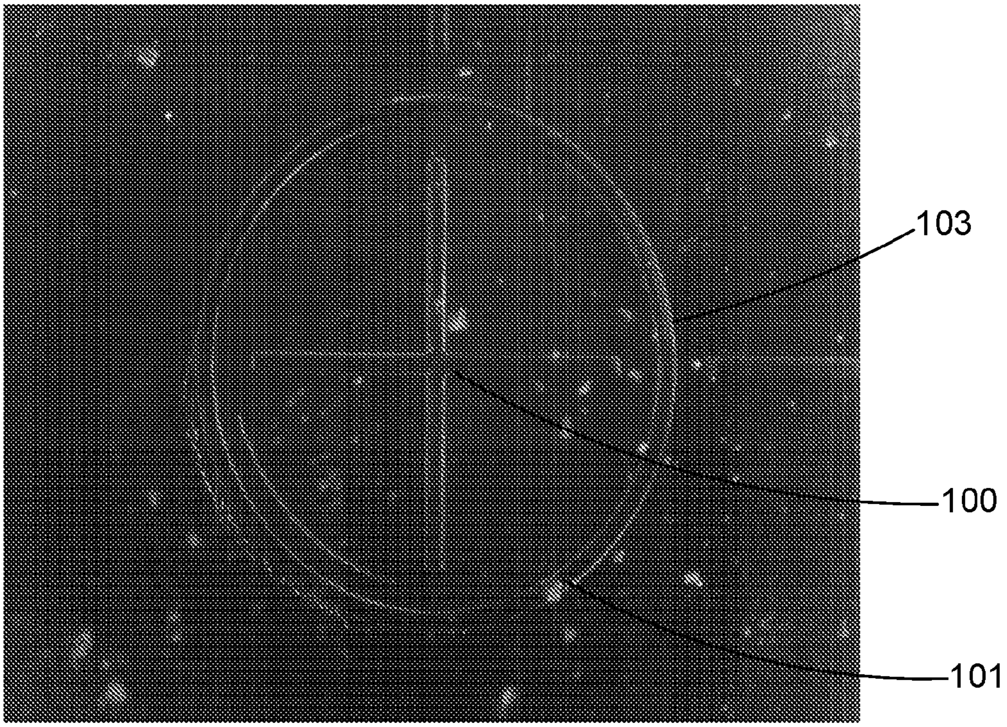
FIGS. 10A to 10B show a fiducial point in the microfluidic chip.
Figure 10B:
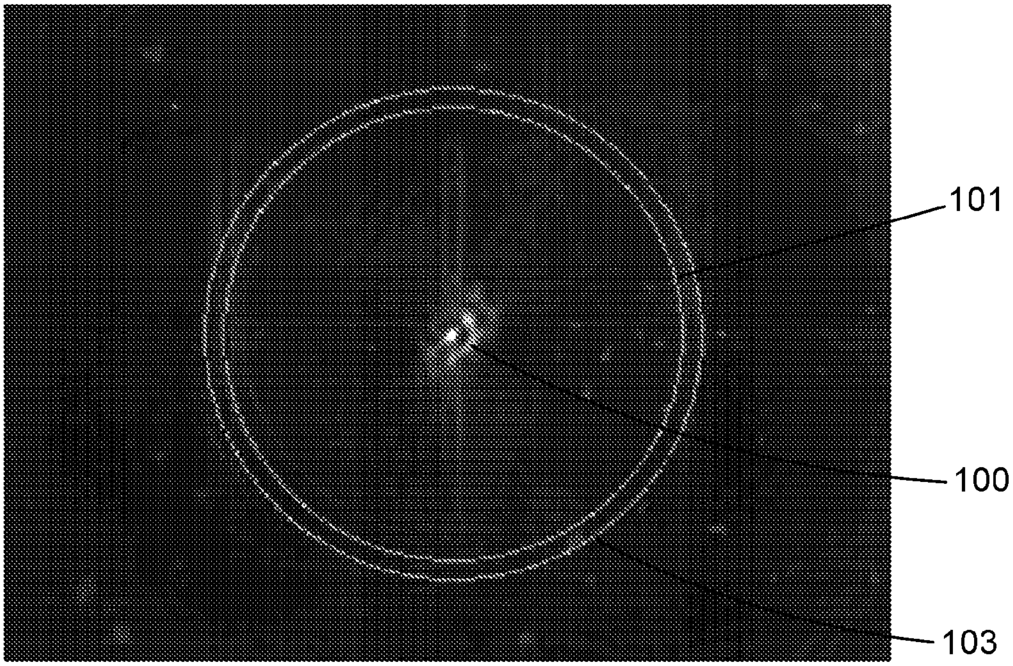

Referring to FIGS. 10A and 10B, the device may comprise one or more fiducials 100 provided on the device or microfluidic chip. The fiducial 100 can be utilised to determine the detection position i.e. X, Y and/or Z position of specific features within the device such as the positions of one or more ports and/or the tortuous portions of one or more channels. A camera image of the fiducial 100, as shown in FIG. 10A, and the output of the fiducial finding algorithm is shown in FIG. 10B. The inner 101 and outer 103 rings have a diameter of approximately 0.96 and 1.04 mm, respectively.

The implementation of the fiducial finding algorithm can be as follows: the fiducials of the chip are optically imaged with a camera and then an image processing algorithm is used to identify the location of the fiducial within the captured image (called hereafter the fiducial position detection algorithm). Another algorithm gives a numerical indication of the focus using a sharpness metric (called hereafter the focus finding algorithm). The cross feature or a circle feature may be used for the positioning algorithm.

The focus finding algorithm applies an edge gradient process to a captured image of the fiducial to show the magnitude of changes from pixel to pixel. If an image is out of focus, the difference from pixel to pixel will be less than that of an in-focus image. A sum of the pixels in the resulting edge gradient process then gives a robust indicator of the relative focus.

The fiducial position detection algorithm also applies an edge gradient to the input image of a fiducial. The two edges of the circle feature of the fiducial are used to identify the fiducial in the image. Suitable template circles of the expected diameter are then convolved with the image. The result of the convolution will have a peak value at the centre of the fiducial. A confidence in the resulting peak value can be calculated by analysing a histogram of the pixels around the peak and comparing it with a histogram of the pixels in the whole image; a result with high confidence would have the majority of the high value pixels around the detected peak, whereas a result with low confidence would have a wider spatial spread of high value pixels.

The fiducial detection algorithm can robustly detect the fiducial to an offset range of ±400 μm from the expected centre position, to a lateral centre position accuracy of approximately 10 μm.

The positioning accuracy is fundamentally limited by the optical resolution of the imaging system, not by the algorithm, and can be increased by increasing the resolving power of the lens.

Instead of a fiducial, the position of other features on the chip such as the outlet ports or specific sections of a channel can be found. Automatically finding the positions of one or more outlet ports or specific sections of a channel such as detection chambers or detection channels can be advantageous since this allows for optimal alignment of the optical detector with the position of the detection feature on the chip.

Detection Position Fine-Adjustment

In some examples, a bright-field or fluorescence image can be taken of detection region to provide a quality check. This means that the user or the apparatus can utilise the bright-field image to adjust the position of the optical detector. The optical detector can be a fluorescence detector. In some embodiments, the detector can be a Photomultiplier Tube (PMT) detector. Use of a PMT detector can be advantageous because it is highly sensitive. Detection position fine-adjustment may be used to avoid anomalies such as scratches, dust and deposits for instance. Avoiding such anomalies allows for more precise measurement of a signal. A camera may be used to take the bright-field or fluorescence image. Use of a camera may be advantageous as it provides an image without the need to scan an area.

The quality check may also be used to discard measurement data where extreme anomalies such as bubbles, fibres or large scratches have been identified.

Confocal Detection

In some instances, a detection region such as a detection port or a detection chamber on the microfluidic device, may have a diameter that is sufficiently large for a (confocal) detection spot having a diameter of 100 nm-1 mm. Using confocal detection in the port means that detection measurements may not be dependent on the liquid fill height of the port, whilst there is still sufficient access to a large detection volume.

In some examples, the fluorescence signal of the sample fluid can be measured at the outlet port or a detection chamber of the microfluidic device. At the outlet port of the microfluidic device, there may be more volume of sample compared to a detection chamber or channel.

By scaling the increased thickness of the fluorescent liquid, for example, approx. 1.2 mm vs 150 μm, a fluorescent signal can be eight times stronger.

As disclosed herein, and unless otherwise specified, the term "confocal" means using an optimised lens and aperture combination to control the region in the sample that contributes to the total measured fluorescent power at the detector. Setting these values appropriately, reduces the contribution from near the liquid surface so that uncertainty in the volume of liquid, and thereby uncertainty in the liquid height, will have a negligible effect on the estimated size ratio. The two parameters that determine the lateral and axial extent of this fluorescence detection volume are the half-angle of the cone of fluorescent light collected by the objective lens, which depends on its numerical aperture (NA), and the radius of the image of a detection aperture in the focal plane.

The source of the detected fluorescent signal is concentrated around an image of the detection aperture in the focal plane of the objective lens. The aperture and the objective lens NA can be thought of as creating a position-weighted sampling in the port. Most of the exit port is either not sampled because it's never reached by excitation rays or has a low contribution to the total detected power. Perhaps most importantly, the power contribution drops below 1% (0.01) at less than 1 mm from the focal plane with the optical parameters described herein.

Figure 11A:
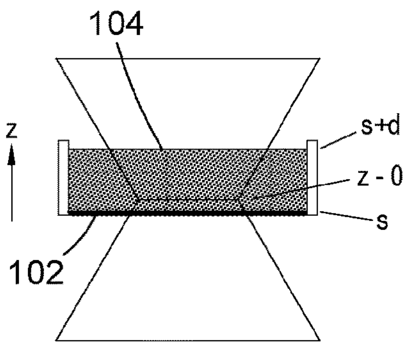
FIG. 11A shows an embodiment of the geometry of the port and the hourglass-shaped excitation profile.
Figure 11B:
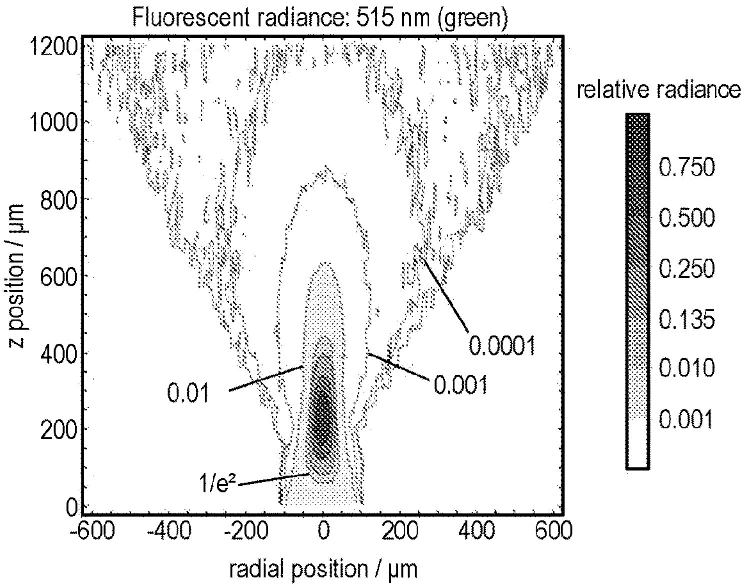
FIG. 11B shows a fluorescent radiance contour plot.

Referring to FIG. 11A, there is shown a schematic which shows the expected geometry of the port and the approximately hourglass-shaped excitation profile. As shown in FIG. 11A, S is the upper surface of the substrate 102; Z—0 is the position of the waist of the excitation profile; d is the depth of the liquid sample. The contour plot, as illustrated in FIG. 11B, of the resulting fluorescent radiance shows how the detection volume is constrained. In this case, the beam waste is positioned above the substrate 102 to reduce the background signal from the substrate. It is also desirable to avoid the water-air interface 104 and to have as large as possible detection volume to catch the largest number of fluorescent molecules possible.

In some embodiments, the substrate 102 can be made out of an optically transparent material. The substrate 102 may also be made out of an elastic material. The substrate 102 can be made out of one or more of the following materials: a polymer, a thermoplastic, a fluoroplastic, glass, fused silica, cyclic olefin copolymer (COC), cyclic olefin polymer (COP), polymethyl methacrylate (PMMA), polydimethylsiloxane (PDMS), and/or polycarbonate.

By way of example only, the diameter of the port may be between 100 μm to 25 mm, or it may above 100 μm, 200 μm, 300 μm, 400 μm, 500 μm, 600 μm, 700 μm, 800 μm, 900 μm, 1 mm, 5 mm, 10 mm, 15 mm or 20 mm. In some instances, the diameter of the port may be less than 25 mm, 20 mm, 15 mm, 10 mm, 5 mm, 1 mm, 900 μm, 800 μm, 700 μm, 600 μm, 500 μm, 400 μm, 300 μm or 200 μm. Typically, the diameter of the port can be 0.8 mm, 1.2 mm or 2 mm.

The height of the port may between 200 μm to 5 mm, or it may be above 300 μm, 400 μm, 500 μm, 600 μm, 700 μm, 800 μm, 900 μm, 1 mm, 2 mm, 3 mm or 4 mm. In some instances, the height of the port may be less than 5 mm, 4 mm, 3 mm, 2 mm, 1 mm, 900 μm, 800 μm, 700 μm, 600 μm, 500 μm, 400 μm or 300 μm. Typically, the height of the port may be between 0.8 mm to 2 mm.

The Z-depth of the confocal spot—given by the distance over which the radiance drops to $1/e^2$—may be between 200 nm and 2 mm. Preferably, the Z-depth is of a similar size but smaller than the height of the port, such as maximally 0.8× the port height or 0.5× the port height or 0.3× the port height or 0.1× the port height. Preferably, the Z-depth is around 400 um.

Viscosity Matching

The viscosity of the auxiliary fluid can be matched with the viscosity of the sample fluid. For instance, the viscosity of the auxiliary fluid may be chosen to be within 20%, 10%, 5% or 1% of the viscosity of the sample fluid. Matching the viscosity of the sample and auxiliary fluids allows for the flow rates of sample and auxiliary fluids to be balanced if the geometrical parts of the sample and auxiliary channel resistances are the same.

By providing an auxiliary fluid with a viscosity of between 1.2 to 2 cP it is possible to mimick a human serum sample. In some instances, the viscosity of the fluid can be 1.6 cP. In some instances, around 14% glycerol in PBS or water (preferably PBS) can be provided to mimic human serum. When performing dilutions of a sample, it would be preferred to dilute the sample fluid and the auxiliary fluid in a solution so that the viscosity of the sample fluid and the auxiliary fluid remain unchanged to approximately within 20%, 10%, 5% or 1%. For example, a human serum sample fluid can be diluted in a solution of 5 to 10% HSA (human serum albumin) in PBS or water (preferably PBS), or the auxiliary fluid (e.g. 14% glycerol) can be diluted in 14% glycerol in PBS or water. The use of glycerol to create a viscosity-matched fluid is advantageous since glycerol is sufficiently inert and readily available.

Matching of the viscosities of the sample and auxiliary fluids as well as diluting the sample and auxiliary fluids in other fluids that keep the viscosities substantially unchanged have the advantage that the viscosity of the sample and auxiliary fluids are the same also after dilution and thus (1) their relative flow rates are unchanged compared to operating with low-viscosity fluids such as PBS and (2) the sample diffuses in a roughly uniform viscosity field.

Viscosity Corrections

The viscosity and the background signal, such as the fluorescence background signal, of the sample fluid (without fluorescent probes) may be measured by recording the fill level and total fluorescence of each port before and after the experiment. For instance, with a z-scan of the back-reflected excitation light and a fluorescence measurement of the content of a detection area, such as a port. The differences in fill level give the volumes that left or entered each port and together with the geometrical chip resistance, the viscosity in each of the channels of the chip can be calculated. Together, the viscosity and background signal can be used to correct the backgrounds for experiments including a fluorescent probe. It is noted that unless every channel of the microfluidic chip has exactly the same geometry, performing a viscosity correction is non-trivial. In other words, it is simply not possible to just subtract the bare background fluorescence value measured in one channel from the sample fluorescence measured in another channel.

The viscosity of the sample fluid can also be determined by comparing the average fluorescence in the two inlet ports, where the auxiliary port has a negligible impact, with the average fluorescence of the outlet ports. If the sample fluid has a lower viscosity than the auxiliary fluid, the fluorescence downstream is higher than upstream and vice versa. The viscosity measured can also be used together with the fluorescence values for background correction.

In either case, the measured size can be corrected for measured or predicted viscosity values.

Run Time Adjustment

The total run time can be adjusted according to the measured or predicted viscosity as shown below in Table 1.

TABLE 1 total run time adjusted according to the measured or predicted viscosity for different hydrodynamic radii $R_h$
Min-Max run time is between 10 sec-10 hours
Typical run time is approximately 1-15 min

| pressures (mbar) | min $R_h$ (nm) | max $R_h$ (nm) | viscosity (H2O) | suction time (min) | viscosity (max) | suction time (min) |
|---|---|---|---|---|---|---|
| 400 | 1.0 | 4.7 | 1.002 | 1.7 | 1.8 | 3.0 |
| 200 | 2.0 | 9.3 | 1.002 | 3.3 | 1.8 | 6.0 |
| 133 | 3.0 | 14.0 | 1.002 | 5.0 | 1.8 | 9.0 |
| 108 | 3.7 | 17.2 | 1.002 | 6.2 | 1.8 | 11.1 |
| 94 | 4.3 | 20.0 | 1.002 | 7.1 | 1.8 | 12.7 |

Z-Scans

To find the optimal position within a detection port in order to detect the maximum amount of fluorescence signal, a Z-scan can be performed. In this instance, a film can be provided that forms the bottom of the microfluidic device. A Z-scan can then be performed by an optical detector whilst recording back-reflected excitation light in order to find the position of the film that forms the bottom of the chip.

If nothing is known about the Z-position of the film, a large scan range may be chosen. In case the Z-position of the film is approximately known for instance from a fiducial-position measurement, a small scan range may be chased. In one example where the fiducial Z-position is not known, the Z-scan range would be from 1 to 1.5 mm or from 1 to 5 mm. The typical scan range if the approximate focus position is already determined from the fiducial focus finding algorithm, would be from 200 and 400 μm if the film position is to be located. If the liquid-air interface is to be measured, then this inevitably may require a longer scan range of between 1 to 1.5 mm (Z-scan plot, vide infra).

To locate the optimal detection position above the film, the focus positioning of the confocal optics, when the fluorescent sample is measured, is made relative to the located chip film position i.e. when Z=0 which is the reference position, and this can be identified by scanning through the port and measuring the back reflected excitation (BRE) light. The focus position can either be above or below the Z=0 position, i.e. Z_focus=+/−dz.

Referring to FIG. 12, the plot shows that the greatest fluorescent power contribution is around 0.200 mm from the film-liquid interface. Therefore, in order to maximise the fluorescence signal from the port, the position of Z_focus should be around 0.2 mm and will depend on the optical system and the target size of the confocal spot.

In some cases, there may be inevitable variation in liquid volume in the detection port. Hence, a small adjustment or offset from the 0.2 mm optimum i.e. moving the focus closer to the surface of the film may be used to reduce the effect of liquid height variability. The advantage of using a smaller offset is that the resulting variance of the fluorescence signal is reduced. However, as a result, the detection volume may also be reduced. There may be situations where this trade-off can be advantageous: particularly for concentrated and/or bright samples, a reduction in detection volume may not be a problem if trade-off is a decreased variance across multiple ports/circuits. It appears that there is no advantage in using a higher offset than the optimum. Therefore, the z-positioning range is therefore from −0.2 to 0.2 mm. In some instances, the z-positioning range may be between −1 mm to +5 mm.

Liquid Levels

Referring to FIG. 13, there is provided a plot which shows the fluorescence signal and the back reflected excitation signal acquired over a range of focus/Z positions for a chip port filled with a fluorescent liquid. The plot as illustrated in FIG. 13 can be analysed to determine the liquid levels in a port.

The BRE peak with the highest intensity is the reflection from the air-film interface, and this is used to accurately position the focus with respect to the chip. The second, lower intensity BRE peak is the reflection from the liquid-air interface. The fluorescence signal shows a maximum at a position between these two BRE peaks.

The distance between these two peaks is the optical path length (OPL) which can straightforwardly be converted to a liquid depth/fill height/thickness by multiplication by the refractive index of the liquid/material. Sample refractive indices will range from 1.33 (water) to 1.37 (human serum).

Accuracy of fill height determination depends on the signal-to-noise ratio of the BRE signal (and therefore the ability to find the two peak locations) which is limited by the excitation irradiance and measurement duration, and the refractive index estimate for the liquid.

Determination of the fill height can allow for the determination of the hydrodynamic resistances and subsequently, determination of viscosities or geometrical properties of the channel. Additionally or alternatively, determining the fill height can also provide a quality checking process such as checking for leaks, blockages and/or drying out of a liquid.

Pre-Measured or Batch-Characterised Resistance Values

Different resistances between multiple microfluidic devices can lead to a difference in the distribution of flow rates through the channels between each of the microfluidic devices, including how much of the auxiliary and sample fluids get pulled through the microfluidic chip and how much of the fluids can flow through after the diffusion channel. In order to provide a uniform set of resistances across a plurality of microfluidic devices, pre-measured or batch-characterised resistance values for each microfluidic chip can be carried out to correct the measured size for any changes in flow rates through the channel network. This information may be stored in any indicia format such as an NFC tag or a laser marking for example, a QR code. Additionally or alternatively, the resistance values of each individual circuit may be measured before, during, or after an experiment and the recorded values may be used to correct for the measured size. These resistance values may be stored in any indicia format such as an NFC tag or a laser marking.

Instrument-Aided Priming

The instrument as disclosed herein can give the chip a small pressure pulse in order to overcome pinning and/or arresting of the liquid-air interface that is moving through the channels via capillary-action. Thus a higher priming success rate can be achieved.

After pipetting the auxiliary fluid into the auxiliary port it capillary fills until a step in the sample port arrests the capillary flow as a result of the flow guide geometry. This may keep the sample fluid and auxiliary fluid from touching and forming an airless join, as the sample fluid contacts the bottom of the well trapping the annulus of air around the bottom of the port. Prior to running in vacuum in the outlet ports, a positive pressure (50-1000 mbar) pulse (0.05-5 s) is applied to the outlet ports which joins the two liquid interfaces at the sample-auxiliary port without a problematic bubble in fluid path. It will therefore be apparent that the reverse pressure pulse joins the fluids after an arresting step in the microfluidics to achieve bubble free interface connection.

Clauses

1. A chip comprising: a plurality of parallel microfluidic circuits, each circuit comprising: a system fluid inlet channel commencing with a system fluid inlet port through which system fluid can be introduced into the circuit; a sample fluid inlet channel commencing with a sample fluid inlet port through which sample fluid can be introduced into the circuit; wherein each inlet port comprises a flow guide that extends around at least part of the perimeter of the inlet port; further comprising an expansion feature between each inlet channel and the corresponding inlet port wherein the expansion feature comprises a tapered section adjacent the channel and a curved section adjacent to the port; a distribution channel in fluid communication with both the system fluid channel and the sample fluid channel; two outlet channels terminating in outlet ports, wherein the outlet channels are in fluid communication with the distribution channel; wherein each of the channels has a maximum width or height no greater than 50 μm and further comprising connectivity for a vacuum source at each of the outlet ports.

2. The chip according to clause 1, wherein the curved section of the expansion feature has a radius of between 0.05 mm and 0.4 mm.

3. The chip according to any one of the preceding clauses, wherein the curved section of the expansion feature has a radius of 0.2 mm.

4. The chip according to any one of the preceding clauses, wherein each outlet port includes a flow guide that extends around at least part of the perimeter of the outlet port.

5. The chip according to any one of the preceding clauses, wherein each of the channels is provided with a coating configured to both prevent sample adhesion and enable efficient filling of the circuit.

6. The chip according to any one of the preceding clauses, wherein the channels have a maximum dimension of 40 μm.

7. The chip according to any one of the preceding clauses, wherein the channels have an extent of 25 μm perpendicular to their maximum dimension.

8. The chip according to any one of the preceding clauses, wherein the coating is hydrophilic.

9. The chip according to any one of the preceding clauses, wherein the coating is hydrophobic.

10. The chip according to any one of the preceding clauses, wherein the chip comprises eight microfluidic circuits.

11. The chip according to any one of the preceding clauses, wherein each outlet port is an open port.

12. The chip according to any one of the preceding clauses, wherein the expansion feature is configured to contain at least one reagent.

13. The chip according to any one of the preceding clauses, wherein the system fluid channel is provided with a hydrophilic coating.

14. The chip according to any one of the preceding clauses wherein the sample fluid channel is provided with a hydrophilic coating.

15. The chip according to any one of the preceding clauses, wherein the system fluid channel is provided with a port through which system fluid can be loaded into the system fluid channel and wherein the surface of the port can be roughened.

16. The chip according to any one of the preceding clauses, wherein the vacuum source is a pump.

17. A method of initiating a microfluidic circuit on a chip according to any one of clauses 1 to 16, the method comprising the steps of: capillary filling the entire microfluidic circuit via the system fluid channel with a system fluid; detecting a background signal in at least one of the channels or ports; introducing a fluid containing a sample to be analysed through the sample fluid channel; connecting a vacuum to the outlet to draw the fluids through the microfluidic circuit; detecting a sample signal relating to the sample to be analysed in at least one of the outlet channels; and correcting the detected sample signal by removing the background signal.

Further Clauses

1. A method for measuring at least one biophysical property of one or more components, the method comprising the steps of: introducing a sample fluid flow comprising one or more components into an elongate distribution channel at a first flow rate, introducing an auxiliary fluid flow into the distribution channel at a second flow rate, providing, in the distribution channel, a lateral distribution of the component(s) from the sample fluid flow into the auxiliary fluid flow until a steady state distribution is reached, separating at least a part of the steady state fluid flow into two or more capillary channels downstream of the distribution channel, stopping the flow of the fluids at a pre-determined time after the steady state distribution has been reached; and measuring at least one biophysical property of the or each component sequentially or simultaneously in each of the capillary channels on a microfluidic chip.

2. The method according to clause 1, wherein the step of flowing the sample fluid flow and the auxiliary fluid flow through the distribution channel is induced by the establishment of a pressure gradient across the distribution channel.

3. The method according to any one of the preceding clauses, wherein the first flow rate and the second flow rate are substantially the same.

4. The method according to any one of the preceding claims, wherein a portion of each of the capillary channels is arranged in a serpentine or tortuous configuration.

5. The method according to any one of the preceding clauses, wherein the step of stopping the flow of fluids is achieved by using a releasable valve.

6. The method according to any one of the preceding clauses, wherein the resistance provided upstream of the distribution channel is greater than the resistance provided downstream from the distribution channel.

7. The method according to clauses 1 to 5, wherein the resistance provided downstream of the distribution channel is greater than the resistance provided upstream from the distribution channel.

8. The method according to any one of the preceding clauses, wherein the resistance of the sample channel, auxiliary channel, the distribution channel or the two or more downstream capillary channels are dictated by one or more of the following: the cross sectional area of the channel, the aspect ratio of the channel, the length of the channel or the surface roughness of the channel.

9. The method according to any one of the preceding clauses, further comprising two or more ports in fluid communication and downstream from the two or more capillary channels.

10. The method according to any one of the preceding clauses, further comprising two or more detection chambers in fluid communication and downstream from the two or more capillary channels.

11. The method according to clause 8, further comprising the step of measuring at least one biophysical property of the or each component sequentially or simultaneously in each of the ports on the microfluidic chip.

12. The method according to clause 9, further comprising the step of measuring at least one biophysical property of the or each component sequentially or simultaneously in each of the detection chamber on the microfluidic chip.

13. The method according to any one of the preceding clauses, further comprising an incubating step during the step of stopping the flow of fluids.

14. The method according to clause 12, further comprising the step of providing a further component to one or more ports.

15. The method according to any one of the preceding clauses, comprising the step of measuring the diffusivity, electrophoretic, diffusophoretic or thermophoretic mobility of one or more of the components.

16. The method according to any one of the preceding clauses, wherein the lateral distribution of the component(s) occurs by diffusion.

17. The method according to clauses 13 to 14, further comprises determining the diffusion co-efficient of at least one of the components in the sample fluid flow.

18. A method of operating a microfluidic analysis on a chip according to any one of the preceding clauses, the method comprising the steps of: detecting a background signal in at least one of the capillary channels; introducing a sample fluid flow to be analysed into the distribution channel; providing, in the distribution channel, a lateral distribution of the component(s) from the sample fluid flow into the auxiliary fluid flow until a steady state distribution is reached, separating at least a part of the steady state fluid flow into two or more capillary channels downstream of the distribution channel, detecting a sample signal relating to the sample to be analysed in at least one of the capillary channels; and correcting the detected sample signal by subtracting the background signal.

19. A flow apparatus for measuring at least one biophysical property of one or more components, the apparatus comprising a sample channel for introducing a sample fluid flow comprising one or more components at a first flow rate into an elongate distribution channel, an auxiliary channel for introducing an auxiliary fluid flow at a second flow rate into the elongate distribution channel, wherein the distribution channel is configured to enable a lateral distribution of the components from the sample fluid flow into the auxiliary fluid flow after a steady state distribution is reached; two or more capillary channels provided downstream and in fluid communication with the distribution channel such that at least a part of the steady state fluid flow that has been reached moves into each of the capillary channels, a switchable pressure source configured to control the flow of the fluids through the channels; and a detector configured to detect and measure at least one biophysical property of the or each component sequentially or simultaneously in each of the capillary channels on a microfluidic chip.

20. The flow apparatus according to clause 19, wherein the diffusion channel, together with the sample channel, the auxiliary channel and the capillary channels, form an H-filter.

21. The flow apparatus according to clauses 19 to 20, wherein a portion of each of the capillary channels are arranged in a serpentine or tortuous configuration.

22. The flow apparatus according to clauses 19 to 21, further comprising a port.

23. The flow apparatus according to clauses 19 to 22, further comprising a detection chamber.

24. The flow apparatus according to clauses 19 to 23, further comprising a second detector provided upstream of the distribution channel, the second detector is configured to detect and measure at least one biophysical property of the or each component in the sample channel.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments, it is not limited to the disclosed embodiments and that alternative embodiments could be constructed without departing from the scope of the invention as defined in the appended claims.

The invention claimed is:

1. A flow apparatus for measuring at least one biophysical property of one or more components, the apparatus comprising:

one or more microfluidic devices, each device comprising:

a sample fluid channel having a sample inlet port for introducing a sample fluid flow comprising the one or more components at a first flow rate into an elongate distribution channel, a system fluid channel having a system inlet port for introducing a system fluid flow at a second flow rate into the elongate distribution channel, wherein the distribution channel is configured to enable a lateral distribution of the components from the sample fluid flow into the system fluid flow;

wherein the sample fluid channel and the system fluid channel are provided with a hydrophilic coating to ensure that the surfaces of the sample and system fluid channels are wetted, such that no bubbles are entrained during the loading of the sample fluid into the sample fluid channel and during the loading of the system fluid into the system fluid channel;

two or more capillary channels provided downstream and in fluid communication with the distribution channel, at least one outlet port provided downstream of each of the capillary channels;

wherein each device further comprises an expansion feature, wherein the expansion feature is positioned between the sample fluid channel and the sample inlet port or between one of the two or more capillary channels and one outlet port of the at least one outlet port provided downstream thereof, whereby the expansion feature comprises a tapered section adjacent to the corresponding channel and a curved section adjacent to the corresponding port, and wherein the curved section of the expansion feature has a radius of between 0.05 mm and 0.4 mm;

a switchable pressure source configured to control the flow of the fluids through the channels; and a detector configured to detect and measure the at least one biophysical property of the one or more components sequentially or simultaneously in each of the capillary channels and/or the at least one outlet port on the microfluidic device.

2. The apparatus according to claim 1, wherein a portion of each of the capillary channels are arranged in a serpentine or tortuous configuration.

3. The apparatus according to claim 1, wherein a portion of each of the sample fluid and/or system fluid channels are arranged in a serpentine or tortuous configuration.

4. The apparatus according to claim 1, further comprising a second detector provided upstream of the distribution channel, the second detector is configured to detect and measure the at least one biophysical property of the one or more components in the sample fluid channel.

5. The apparatus according to claim 1, wherein each of the channels has a maximum width or height no greater than 100 μm.

6. The apparatus according to claim 1, further comprising a flow guide that extends around at least part of the perimeter of the sample inlet port and/or the at least one outlet port.

7. The apparatus according to claim 1, wherein the system inlet port further comprises an expansion feature between the system fluid channel and the system inlet port.

8. The apparatus according to claim 7, wherein the system inlet port includes a flow guide that extends around at least part of the perimeter of the system inlet port.

9. The apparatus according to claim 1, wherein each microfluidic device further comprises an active position-finding guide configured to locate a detection position within the one outlet port of the at least one outlet port and/or within a tortuous portion of the one of the two or more capillary channels.

10. The apparatus according to claim 9, wherein the active position-finding guide is configured to locate a detection position within the one outlet port of the at least one outlet port.

11. The apparatus according to claim 9, wherein the active position-finding guide is a fiducial point.

12. The apparatus according to claim 1, wherein the sample fluid channel and the system fluid channel are provided with an anti-adhesion coating configured to both prevent sample adhesion and enable efficient filling of the one or more microfluidic devices.

13. The apparatus according to claim 1, wherein the sample fluid channel, the system fluid channel, the distribution channel, and the two or more capillary channels have a width of 40 μm.

14. The apparatus according to claim 1, wherein the sample fluid channel, the system fluid channel, the distribution channel, and the two or more capillary channels have a height of up to 25 μm perpendicular to their maximum dimension.

15. The apparatus according to claim 1, wherein the at least one outlet port is an open port.

16. The apparatus according to claim 1, wherein the detector is a confocal detector, the confocal detector is configured to detect and measure the at least one biophysical property of the one or more components within the one outlet port of the at least one outlet port and/or within a tortuous portion of the one of the two or more capillary channels.

17. The apparatus according to claim 1, wherein the expansion feature is positioned between the sample fluid channel and the sample inlet port.

18. The apparatus according to claim 17, further comprising a second expansion feature, and wherein the second expansion feature is positioned between the one of the two or more capillary channels and the one outlet port of the at least one outlet port.

19. The apparatus according to claim 1, wherein the expansion feature is positioned between the one of the two or more capillary channels and the one outlet port of the at least one outlet port.

* * * * *